US011976618B2

(12) United States Patent
Yamamoto et al.

(10) Patent No.: US 11,976,618 B2
(45) Date of Patent: May 7, 2024

(54) FUEL INJECTION VALVE

(71) Applicant: DENSO CORPORATION, Kariya (JP)

(72) Inventors: Shinsuke Yamamoto, Kariya (JP); Yuki Watanabe, Kariya (JP); Atsuya Okamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 422 days.

(21) Appl. No.: 17/367,766

(22) Filed: Jul. 6, 2021

(65) Prior Publication Data

US 2021/0332780 A1 Oct. 28, 2021

Related U.S. Application Data

(63) Continuation of application No. PCT/JP2019/050364, filed on Dec. 23, 2019.

(30) Foreign Application Priority Data

Jan. 8, 2019 (JP) ................................ 2019-001363

(51) Int. Cl.
*F02M 51/06* (2006.01)

(52) U.S. Cl.
CPC ................................ *F02M 51/061* (2013.01)

(58) Field of Classification Search
CPC ............ F02M 51/061; F02M 51/0682; F02M 51/0685; F02M 51/0664
USPC ...................................................... 239/585.4
See application file for complete search history.

(56) References Cited

U.S. PATENT DOCUMENTS

2008/0035761 A1* 2/2008 Akabane ............ F02M 51/0614 29/890.142
2011/0001073 A1 1/2011 Ogawa et al.
2011/0057059 A1* 3/2011 Yamamoto ............ F02M 61/12 239/584

FOREIGN PATENT DOCUMENTS

| | | |
|---|---|---|
| JP | 2003-106236 | 4/2003 |
| JP | 2006-307870 | 11/2006 |
| JP | 2011-52557 | 3/2011 |
| JP | 2015-224596 | 12/2015 |
| JP | 2018133530 A | 8/2018 |
| WO | 2018/083795 | 11/2018 |

* cited by examiner

*Primary Examiner* — Yi-Kai Wang
(74) *Attorney, Agent, or Firm* — Nixon & Vanderhye P.C.

(57) ABSTRACT

A fixed core generates a magnetic attraction force with energization of a coil. A movable core has an attracted surface facing an attracting surface of the fixed core is attracted to the fixed core to cause the valve body to open a nozzle hole. A stopper member abuts against the movable core to restrict movement of the movable core. The movable core has an abutment portion that abuts against the stopper member, and a core body portion in which the attracted surface is formed. The attracting surface and the attracted surface extend annularly around an axis line of the fixed core, are formed so as to be separated from each other in an axis line direction in a state where the abutment portion abuts against the stopper member, and a separation distance from each other increases toward a radially outer side.

13 Claims, 23 Drawing Sheets

VALVE CLOSING

FUEL INJECTION VALVE

CROSS REFERENCE TO RELATED APPLICATION

The present application is a continuation application of International Patent Application No. PCT/JP2019/050364 filed on Dec. 23, 2019, which designated the U.S. and claims the benefit of priority from Japanese Patent Application No. 2019-001363 filed on Jan. 8, 2019. The entire disclosures of all of the above applications are incorporated herein by reference.

TECHNICAL FIELD

The present disclosure relates to a fuel injection valve.

BACKGROUND

The conventional fuel injection valve includes a valve body that opens and closes a nozzle hole for injecting fuel, a fixed core that generates a magnetic attraction force, and a movable core that is attracted by the fixed core to cause the valve body to perform a valve opening operation.

SUMMARY

A fuel injection valve according to a first aspect of the present disclosure comprises: a valve body configured to open and close a nozzle hole to inject fuel; a fixed core configured to generate a magnetic attraction force with energization of a coil and has an attracting surface on which a magnetic attraction force is to act; and a movable core that has an attracted surface facing the attracting surface and is configured to be attracted to the fixed core in a state of being engaged with the valve body to cause the valve body to perform a valve opening operation.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
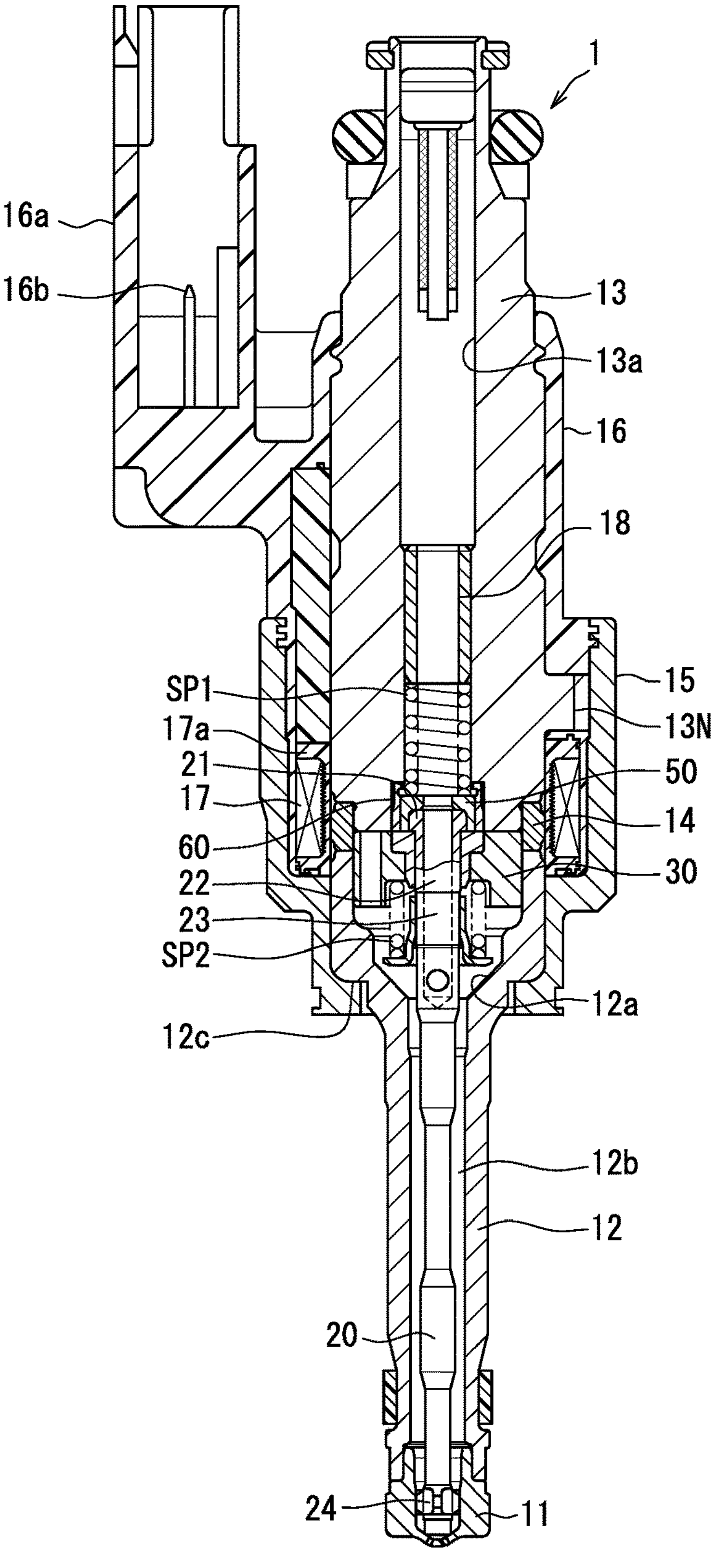
FIG. 1 is a cross-sectional view of a fuel injection valve according to a first embodiment.

As follows, examples of the present disclosure will be described.

According to an example of the present disclosure, a fuel injection valve includes a valve body that opens and closes a nozzle hole for injecting fuel, a fixed core that generates a magnetic attraction force, and a movable core that is attracted by the fixed core to cause the valve body to perform a valve opening operation.

According to an example of the present disclosure, the movement of the movable core to a side opposite to the nozzle hole is restricted by causing a portion of the inner annular protrusion of the movable core to abut against the fixed core.

As described above, in a state where the inner annular protrusion (abutment portion) abuts against the fixed core, a portion (non-abutment portion) of the movable core radially outer side of the inner annular protrusion forms a gap with the fixed core. It would be desirable that the non-abutment portion is made of a material that is advantageous for a magnetic attraction force. It would be desirable that the abutment portion has a hardness higher than that of the non-abutment portion so as to be advantageous in collision resistance.

The fuel located in the gap is compressed with the valve opening operation, and acts on the movable core as a damper force to reduce a valve opening speed. The smaller the gap, the larger the damper force can be, and the larger the damper force, the lower the speed at which the movable core collides with the fixed core can be. As a result, damage to the movable core and the fixed core due to collision can be restricted, and a behavior that the movable core collides with the fixed core and moves (bounces) to the valve closing side can be restricted.

However, the movable core can tilt relative to an axis line of the fixed core. Therefore, as the gap is set smaller to increase the damper force, there is a higher possibility that the non-abutment portion comes into contact with the fixed core, and there is a concern that the non-abutment portion is damaged.

According to an example of the present disclosure, a fuel injection valve includes: a valve body configured to open and close a nozzle hole to inject fuel; a fixed core configured to generate a magnetic attraction force with energization of a coil and has an attracting surface on which a magnetic attraction force is to act; a movable core that has an attracted surface facing the attracting surface and is configured to be attracted to the fixed core in a state of being engaged with the valve body to cause the valve body to perform a valve opening operation; and a stopper member configured to abut against the movable core to restrict movement of the movable core in a direction opposite from the nozzle hole. The movable core has an abutment portion configured to abut against the stopper member and a core body portion in which the attracted surface is formed. The attracting surface and the attracted surface have a shape extending annularly around an axis line of the fixed core, are formed so as to be separated from each other in an axis line direction in a state where the abutment portion abuts against the stopper member, and are formed in a shape in which a separation distance from each other increases toward a radially outer side of an annular shape.

In the movable core described in the above example, the separation distance of the outer annular protrusion, which is a portion located radially outermost side, may be smaller than the separation distance of the movable working surface, which is a portion located inside thereof. Therefore, in a case where the separation distance at the outer annular protrusion is set such that the outer annular protrusion does not come into contact with the fixed core in consideration of the tilt of the movable core which is described above, there is room for reducing the separation distance at the movable working surface. That is, there is room for increasing the damper force which is described above by reducing a volume (core gap volume) of the gap between the movable side core and the fixed side core.

On the other hand, in the fuel injection valve according to this example, the attracting surface and the attracted surface are formed in a shape in which the separation distance is larger toward the radially outer side of the annular shape. Therefore, the core gap volume can be reduced as compared with the above example while setting the attracting surface and the attracted surface so as not to come into contact with each other in consideration of the tilt of the movable core. Therefore, it is possible to increase the damper force while reducing the concern of damage of the movable core.

Hereinafter, multiple embodiments of the present disclosure will be described with reference to the drawings. Duplicate description may be omitted by assigning the same reference numerals to the corresponding configuration elements in each embodiment. In a case where only a part of the configuration is described in each embodiment, the configurations of the other embodiments described above can be applied to the other parts of the configuration. Not only the combinations of the configurations explicitly illustrated in the description of each embodiment, but also the configurations of multiple embodiments can be partially combined even if they are not explicitly illustrated if there is no problem in the combination in particular. Unspecified combinations of the configurations described in multiple embodiments and the modifications are also disclosed in the following description.

First Embodiment

A fuel injection valve 1 illustrated in FIG. 1 is attached to a cylinder head or a cylinder block of an ignition type internal combustion engine mounted on a vehicle. Liquid gasoline fuel stored in an in-vehicle fuel tank is pressurized by a fuel pump (not illustrated) and supplied to the fuel injection valve 1, and the supplied high-pressure fuel is directly injected into the combustion chamber of the internal combustion engine from a nozzle hole 11*a* formed in the fuel injection valve 1.

The fuel injection valve 1 includes a nozzle hole body 11, a main body 12, a fixed core 13, a non-magnetic member 14, a coil 17, a support member 18, a first spring member SP1, a second spring member SP2, a needle 20, a movable core 30, a sleeve 40, a cup 50, a guide member 60, and the like. The nozzle hole body 11, the main body 12, the fixed core 13, the support member 18, the needle 20, the movable core 30, the sleeve 40, the cup 50, and the guide member 60 are made of metal.

Figure 2:
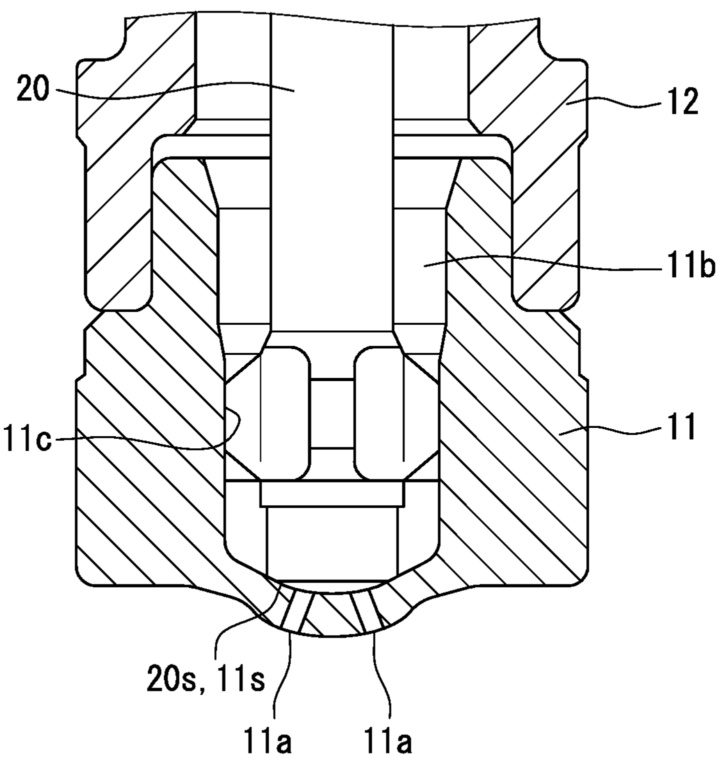
FIG. 2 is an enlarged view of a nozzle hole portion of FIG. 1.

As illustrated in FIG. 2, the nozzle hole body 11 has multiple nozzle holes 11*a* for injecting fuel. The needle 20 is located inside the nozzle hole body 11, and a flow channel 11*b* through which the high-pressure fuel flows to the nozzle hole 11*a* is formed between an outer peripheral surface of the needle 20 and an inner peripheral surface of the nozzle hole body 11. A body-side seat 11*s* where a valve body-side seat 20*s* formed in the needle 20 is unseated from and seated on is formed on the inner peripheral surface of the nozzle hole body 11. The valve body-side seat 20*s* and the body-side seat 11*s* have a shape extending annularly around an axis line C of the needle 20. When the needle 20 is unseated from and seated on the body-side seat 11*s*, the flow channel 11*b* is opened and closed, and the nozzle hole 11*a* is opened and closed.

The main body 12 and the non-magnetic member 14 have a cylindrical shape. A cylindrical end portion of the main body 12 in a direction (nozzle hole side) closer to the nozzle hole 11*a* with respect to the main body 12, is welded to be fixed to the nozzle hole body 11. A cylindrical end portion of the main body 12 on a side (side opposite to the nozzle hole) in a direction away from the nozzle hole 11*a* with respect to the main body 12, is welded to be fixed to a cylindrical end portion of the non-magnetic member 14. A cylindrical end portion of the non-magnetic member 14 on the side opposite to the nozzle hole is welded to be fixed to the fixed core 13.

A nut member 15 is fastened to a threaded portion 13N of the fixed core 13 in a state of being locked to a locking portion 12*c* of the main body 12. An axial force generated by the fastening causes a surface pressure to generate with respect to the nut member 15, the main body 12, the non-magnetic member 14, and the fixed core 13 to be pressed against each other in the axis line C direction (vertical direction in FIG. 1). Instead of generating such a surface pressure by the screw fastening, it may be generated by the press-fit.

The main body 12 is formed of a magnetic material such as stainless steel, and has a flow channel 12*b* for causing the fuel to flow to the nozzle hole 11*a*. In the flow channel 12*b*, the needle 20 is accommodated in a movable state in the axis line C direction. The main body 12 and the non-magnetic member 14 function as a "holder" having a movable chamber 12*a* filled with fuel therein. In the movable chamber 12*a*, a movable portion M (see FIG. 4), which is an assembly in which the needle 20, the movable core 30, the second spring member SP2, the sleeve 40, and the cup 50 are assembled, is accommodated in a movable state.

The flow channel 12*b* communicates with a downstream side of the movable chamber 12*a* and has a shape extending in the axis line C direction. The center lines of the flow channel 12*b* and the movable chamber 12*a* coincide with the cylinder center line of the main body 12 and the cylinder center line (axis line C) of the fixed core 13. A portion of the needle 20 on the nozzle hole side is slidably supported by the inner wall surface 11*c* of the nozzle hole body 11, and a portion of the needle 20 on the side opposite to the nozzle hole is slidably supported by the inner wall surface 51*b* (see FIG. 5) of the cup 50. As described above, by slidably supporting two positions of an upstream end portion and a downstream end portion of the needle 20, a movement of the needle 20 in a radial direction is regulated, and a tilt of the needle 20 with respect to the axis line C of the main body 12 is regulated.

The needle 20 corresponds to a "valve body" that opens and closes the nozzle hole 11*a*, is formed of magnetic material such as stainless steel, and has a shape extending in the axis line C direction. The valve body-side seat 20*s* described above is formed on a downstream-side end surface of the needle 20. When the needle 20 moves to the downstream side in the axis line C direction (valve closing operation), the valve body-side seat 20*s* is seated on the body-side seat 11*s*, and the flow channel 11*b* and the nozzle hole 11*a* are closed. When the needle 20 moves to the upstream side in the axis line C direction (valve opening operation), the valve body-side seat 20*s* is unseated from the body-side seat 11*s*, and the flow channel 11*b* and the nozzle hole 11*a* are opened.

Figure 3:
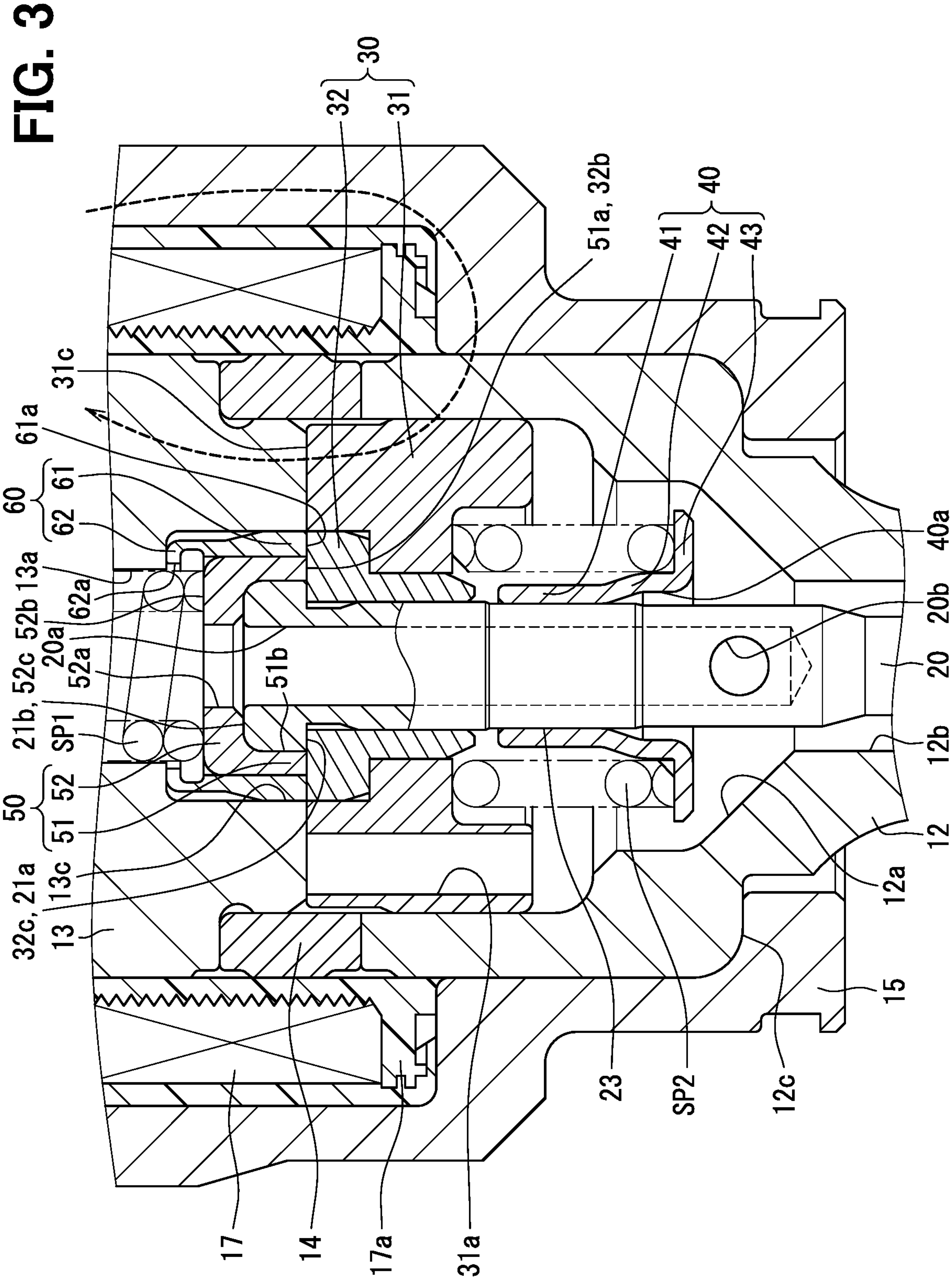
FIG. 3 is an enlarged view of a movable core portion of FIG. 1.

The needle 20 has an internal passage 20*a* and a lateral hole 20*b* for causing the fuel to flow to the nozzle hole 11*a* (see FIG. 3). Multiple lateral holes 20*b* are formed in a circumferential direction. Multiple lateral holes 20*b* are formed at equal intervals in the circumferential direction. The internal passage 20*a* has a shape extending in the axis line C direction of the needle 20. An inflow port is formed at an upstream end of the internal passage 20*a*, and the lateral hole 20*b* is connected to a downstream end of the internal passage 20*a*. The lateral hole 20*b* extends in a direction intersecting the axis line C direction and communicates with the movable chamber 12*a*.

As illustrated in FIG. 1, the needle 20 has an abutment portion 21, a core sliding portion 22, a press-fit portion 23, and a nozzle hole-side support portion 24 in this order from the side (upper end side) opposite to a lower end side of the valve body-side seat 20*s*. The abutment portion 21 has a valve body abutment surface 21*b* at the time of valve closing which abuts against the valve closing force transmission abutment surface 52*c* of the cup 50. The cup 50 is slidably assembled to the abutment portion 21, and the outer peripheral surface of the abutment portion 21 slides with the inner peripheral surface of the cup 50. The movable core 30 is slidably assembled to the core sliding portion 22, and the outer peripheral surface of the core sliding portion 22 slides with the inner peripheral surface of the movable core 30. A sleeve 40 is press-fitted and fixed to the press-fit portion 23. The nozzle hole-side support portion 24 is slidably supported by the inner wall surface 11*c* of the nozzle hole body 11.

The cup 50 has a disk portion 52 in a disk shape and a cylindrical portion 51 in a cylindrical shape. A disk portion 52 has a through-hole 52*a* penetrating in the axis line C direction. A surface of the disk portion 52 on the side opposite to the nozzle hole functions as a spring abutment surface 52*b* that abuts against the first spring member SP1. A surface of the disk portion 52 on the nozzle hole side functions as a valve closing force transmission abutment surface 52*c* that abuts against the needle 20 and transmits a first elastic force (valve closing elastic force). The disk portion 52 functions as a "valve body transmission portion" that abuts against the first spring member SP1 and the needle 20 to transmit a first elastic force to the needle 20. The cylindrical portion 51 has a cylindrical shape extending from an outer peripheral end of the disk portion 52 to the nozzle hole side. A nozzle hole-side end surface of the cylindrical portion 51 functions as a core abutment end surface 51*a* that abuts against the movable core 30. The inner wall surface 51*b* of the cylindrical portion 51 slides with the outer peripheral surface of the abutment portion 21 of the needle 20.

The fixed core 13 is formed of a magnetic material such as stainless steel, and has a flow channel 13*a* on an inside thereof for causing the fuel to flow to the nozzle hole 11*a*. The flow channel 13*a* communicates with the internal passage 20*a* (see FIG. 3) formed inside the needle 20 and the upstream side of the movable chamber 12*a*, and has a shape extending in the axis line C direction. The guide member 60, the first spring member SP1, and the support member 18 are accommodated in the flow channel 13*a*.

The support member 18 has a cylindrical shape and is press-fitted and fixed to the inner wall surface of the fixed core 13. The first spring member SP1 is a coil spring located on the downstream side of the support member 18, and elastically deforms in the axis line C direction. An upstream-side end surface of the first spring member SP1 is supported by the support member 18, and a downstream-side end surface of the first spring member SP1 is supported by the cup 50. The cup 50 is urged to the downstream side by a force (first elastic force) generated by the elastic deformation of the first spring member SP1. By adjusting the press-fit amount of the support member 18 in the axis line C direction, a magnitude (first set load) of an elastic force for urging the cup 50 is adjusted.

The guide member 60 has a cylindrical shape formed of a magnetic material such as stainless steel, and is press-fitted and fixed to an enlarged diameter portion 13*c* formed in the fixed core 13. The enlarged diameter portion 13*c* has a shape in which the flow channel 13*a* is enlarged in the radial direction. The guide member 60 has a disk portion 62 in a disk shape and a cylindrical portion 61 in a cylindrical shape. The disk portion 62 has a through-hole 62*a* penetrating in the axis line C direction. An opposite nozzle hole-side end surface of the disk portion 62 abuts against the inner wall surface of the enlarged diameter portion 13*c*. The cylindrical portion 61 has a cylindrical shape extending from the outer peripheral end of the disk portion 62 to the nozzle hole side. The nozzle hole-side end surface of the cylindrical portion 61 functions as a stopper abutment end surface 61*a* that abuts against the movable core 30. An inner wall surface of the cylindrical portion 51 forms a sliding surface 61*b* that slides with the outer peripheral surface 51*d* of the cylindrical portion 51 of the cup 50.

In short, the guide member 60 has a guide function of sliding the outer peripheral surface of the cup 50 moving in the axis line C direction and a stopper function of restricting the movement of the movable core 30 toward the side opposite to the nozzle hole by abutting against the movable core 30 which moves in the axis line C direction. That is, the guide member 60 functions as a "stopper member" that abuts against the movable core 30 and restricts the movement of the movable core 30 in the direction away from the nozzle hole 11*a*.

A resin member 16 is provided on the outer peripheral surface of the fixed core 13. The resin member 16 has a connector housing 16*a*, and a terminal 16*b* is accommodated inside the connector housing 16*a*. The terminal 16*b* is electrically connected to the coil 17. An external connector (not illustrated) is connected to the connector housing 16*a*, and power is supplied to the coil 17 through the terminal 16*b*. The coil 17 is wound around a bobbin 17*a* having an electrical insulation property to form a cylindrical shape, and is located radially outer side of the fixed core 13, the non-magnetic member 14, and the movable core 30. The fixed core 13, the nut member 15, the main body 12, and the movable core 30 form a magnetic circuit through which a magnetic flux generated with the supply of power (energization) to the coil 17 flows (see a dotted arrow in FIG. 3).

The movable core 30 is located on the nozzle hole side with respect to the fixed core 13, and is accommodated in the movable chamber 12*a* in a movable state in the axis line C direction. The movable core 30 has an outer core 31 and an inner core 32. The outer core 31 has a cylindrical shape formed of a magnetic material such as stainless steel, and the inner core 32 has a cylindrical shape formed of a non-magnetic material such as stainless steel. The outer core 31 is press-fitted and fixed to an outer peripheral surface of the inner core 32.

The needle 20 is inserted to be located inside the cylinder of the inner core 32. The inner core 32 is assembled to the needle 20 in a slidable state in the axis line C with respect to the needle 20. A gap (inner gap) between the inner peripheral surface of the inner core 32 and the outer peripheral surface of the needle 20 is set smaller than a gap (outer gap) between the outer peripheral surface of the outer core 31 and the inner peripheral surface of the main body 12. These gaps are set such that the outer core 31 does not come into contact with the main body 12 while causing the inner core 32 to come into contact with the needle 20.

The inner core 32 abuts against the guide member 60 as a stopper member, the cup 50, and the needle 20. Therefore, a material having a higher hardness than that of the outer core 31 is used for the inner core 32. The outer core 31 has a movable core facing surface 31*c* facing the fixed core 13, and a gap is formed between the movable core facing surface 31*c* and the fixed core 13. Therefore, in a state where the magnetic flux flows by energizing the coil 17 as described above, the magnetic attraction force attracted to the fixed core 13 acts on the outer core 31 by forming the gap.

The sleeve 40 functions as a "fixing member" press-fitted and fixed to the needle 20 in the axis line C direction. The sleeve 40 is made of a cylindrical metal having a through-hole 40*a* (see FIG. 3). The sleeve 40 is press-fitted and fixed to the press-fit portion 23 of the needle 20. The sleeve 40 supports the nozzle hole-side end surface of the second spring member SP2. It is desirable that the needle 20 has a hardness higher than that of the sleeve 40. It is desirable that the sleeve 40 has a hardness higher than the movable core 30. A specific example of a material of the needle 20 is martensitic stainless. A specific example of a material of the sleeve 40 is ferritic stainless steel.

The second spring member SP2 is a coil spring elastically deformed in the axis line C direction. The nozzle hole-side end surface of the second spring member SP2 is supported by the sleeve 40, and the opposite nozzle hole-side end surface is supported by the outer core 31. The outer core 31 is urged to the side opposite to the nozzle hole by a force (second elastic force) generated by the elastic deformation of the second spring member SP2. By adjusting the press-fit amount of the sleeve 40 into the needle 20, the magnitude (second set load) of the second elastic force for urging the movable core 30 at the time of valve closing is adjusted. The second set load of the second spring member SP2 is smaller than the first set load of the first spring member SP1. Not only at the time of valve closing but also at the time of urging the movable core 30 in another situation, the magnitude of the second elastic force may be set as the second set load adjusted by the press-fit amount.

<Description of Operation>

Next, an operation of the fuel injection valve 1 will be described with reference to FIG. 4.

Figure 4:
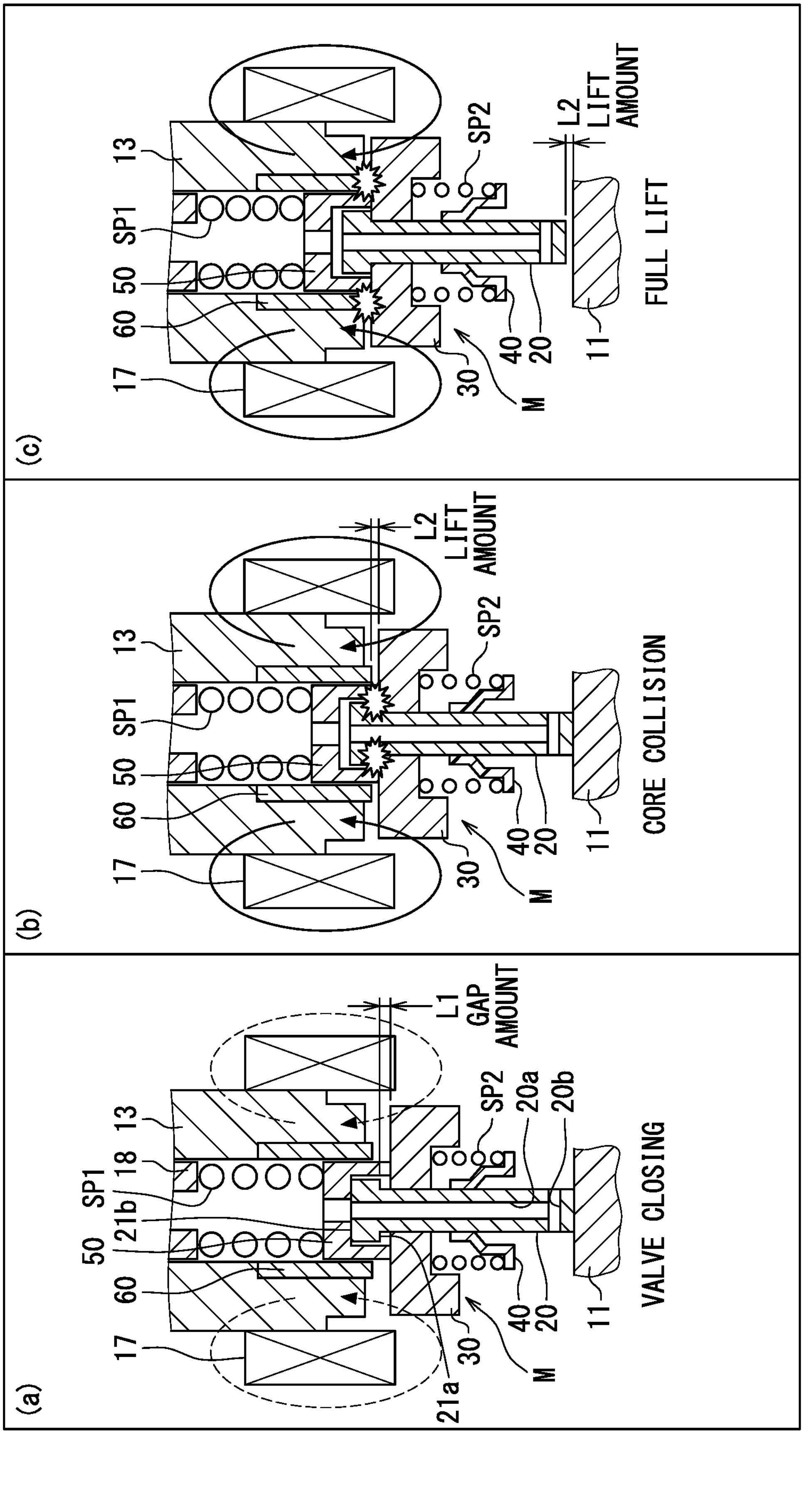
FIG. 4 is a schematic view illustrating an operation of the fuel injection valve according to the first embodiment, in which (a) illustrates a valve close state, (b) illustrates a state where the movable core moving by a magnetic attraction force collides with a valve body, and (c) illustrates a state where the movable core moving further by a magnetic attraction force collides with a guide member.

As illustrated in column (a) in FIG. 4, in a state where the energization of the coil 17 is turned off, no magnetic attraction force is generated, so that the magnetic attraction force urged toward the valve opening side does not act on the movable core 30. The cup 50 urged toward the valve closing side by the first elastic force of the first spring member SP1 abuts against the valve body abutment surface 21*b* (see FIG. 3) of the needle 20 at the time of valve closing and the inner core 32 to transmit the first elastic force.

The movable core 30 is urged toward the valve closing side by the first elastic force of the first spring member SP1 transmitted from the cup 50, and is urged toward the valve opening side by the second elastic force of the second spring member SP2. Since the first elastic force is larger than the second elastic force, the movable core 30 is in a state of being pushed by the cup 50 and moved (lifted down) toward the nozzle hole. The needle 20 is urged toward the valve closing side by the first elastic force transmitted from the cup 50, and is in a state of pushed by the cup 50 and moved (lifted down) to the nozzle hole side, that is, in a state of being seated on the body-side seat 11*s* to close the valve. In this valve close state, a gap is formed between the valve body abutment surface 21*a* (see FIG. 3) of the needle 20 at the time of valve opening and the movable core 30 (inner core 32), and a length of the gap in the axis line C direction in the valve close state is referred to as a gap amount L1.

As illustrated in column (b) of FIG. 4, in a state immediately after the energization of the coil 17 is switched from off to on, the magnetic attraction force urged toward the valve opening side acts on the movable core 30, so that the movable core 30 initiates the movement to the valve opening side. When the movable core 30 moves while pushing up the cup 50 and an amount of the movement thereof reaches the gap amount L1, the inner core 32 collides with the valve body abutment surface 21*a* of the needle 20 when the valve is opened. At the time of the collision, a gap is formed between the guide member 60 and the inner core 32, and a length of the gap in the axis line C direction is referred to as a lift amount L2.

During a period up to the time of the collision, a valve closing force by a fuel pressure applied to the needle 20 is not applied to the movable core 30, so that a collision speed of the movable core 30 can be increased accordingly. Since such a collision force is added to the magnetic attraction force and used as the valve opening force of the needle 20, the needle 20 can perform the valve opening operation even with the high-pressure fuel while restricting an increase in the magnetic attraction force required for valve opening.

After the collision, the movable core 30 further continues to move by the magnetic attraction force, and when the amount of the movement after the collision reaches the lift amount L2, as illustrated in column (c) in FIG. 4, the inner core 32 collides with the guide member 60 to stop the movement. A separation distance between the body-side seat 11*s* and the valve body-side seat 20*s* in the axis line C direction at the time of the stop of this movement corresponds to a full lift amount of the needle 20, and coincides with the lift amount L2 described above.

After that, when the energization of the coil 17 is switched from on to off, the magnetic attraction force also decreases as a drive current decreases, and the movable core 30 initiates the movement to the valve closing side together with the cup 50. The needle 20 is pushed by the pressure of the fuel filled between the needle 20 and the cup 50 to initiate the lift-down (valve closing operation) simultaneously with the initiation of the movement of the movable core 30.

After that, when the needle 20 is lifted down by the lift amount L2, the valve body-side seat 20*s* is seated on the body-side seat 11*s*, and the flow channel 11*b* and the nozzle hole 11*a* are closed. After that, the movable core 30 continues to move toward the valve closing side together with the cup 50, and when the cup 50 abuts against the needle 20, the movement of the cup 50 toward the valve closing side stops. After that, the movable core 30 further continues to move toward the valve closing side (inertial movement) by an inertial force, and then moves (rebounds) toward the valve opening side by the elastic force of the second spring member SP2. After that, the movable core 30 collides with the cup 50 and moves (rebounds) toward the valve opening side together with the cup 50, but is quickly pushed back by the valve closing elastic force and converges to the initial state illustrated in the column (a) of FIG. 4.

Therefore, the smaller the rebound and the shorter the time required for convergence, the shorter the time to return to the initial state from the end of injection is. Therefore, when executing multi-stage injection in which fuel is injected multiple times per combustion cycle of the internal combustion engine, an interval between injections can be shortened and the number of injections included in the multi-stage injection can be increased. By shortening the convergence time as described above, it is possible to control the injection amount with high accuracy in a case where partial lift injection described below is executed. The partial lift injection is injection of a minute amount due to a short valve opening time by stopping the energization of the coil 17 and initiating the valve closing operation before the valve opening operation needle 20 reaches the full lift position.

<Detailed Description of Configuration Group A>

Next, a configuration group A including at least a configuration related to the fixed core facing surface 13*b* and the movable core facing surface 31*c* among the configurations included in the fuel injection valve 1 according to the present embodiment will be described in detail with reference to FIGS. 5 to 7. A modification of the configuration group A will be described later with reference to FIG. 8. The fixed core facing surface 13*b* corresponds to an "attracting surface" for attracting the movable core 30 by a magnetic attraction force generated with energization of the coil 17. The movable core facing surface 31*c* corresponds to an "attracted surface" located to face the fixed core facing surface 13*b* (attracting surface). The inner core 32 corresponds to an "abutment portion" that abuts against the guide member 60 (stopper member). The outer core 31 corresponds to a "core body portion" on which the movable core facing surface 31*c* (attracted surface) is formed.

The fixed core facing surface 13*b* (attracting surface) and the movable core facing surface 31*c* (attracted surface) have a shape extending annularly around the axis line C and are formed in a flat shape. The fixed core facing surface 13*b* (attracting surface) and the movable core facing surface 31*c* are formed so as to be separated from each other in the axis line direction when the inner core 32 is in contact with the guide member 60 (see FIG. 5). The distance in the axis line direction which is separated in this manner is referred to as a separation distance Ha in the following description.

The movable core 30 can tilt with respect to the fixed core 13. In the following description, a state where the movable core 30 tilts as described above, that is, a state where the axis line direction of the movable core 30 tilt with respect to the axis line direction of the fixed core 13 (tilt state) and a state where both the axis line directions match (non-tilt state) will be described separately.

In the non-tilt state, the movable core facing surface 31*c* is formed in a flat shape extending perpendicularly to the axis line direction of the fixed core 13. The fixed core facing surface 13*b* is formed in a tapered shape inclining with respect to the axis line direction of the fixed core 13. The direction of inclination according to the tapered shape is such that the separation distance Ha increases toward a radially outer side.

Figure 5:
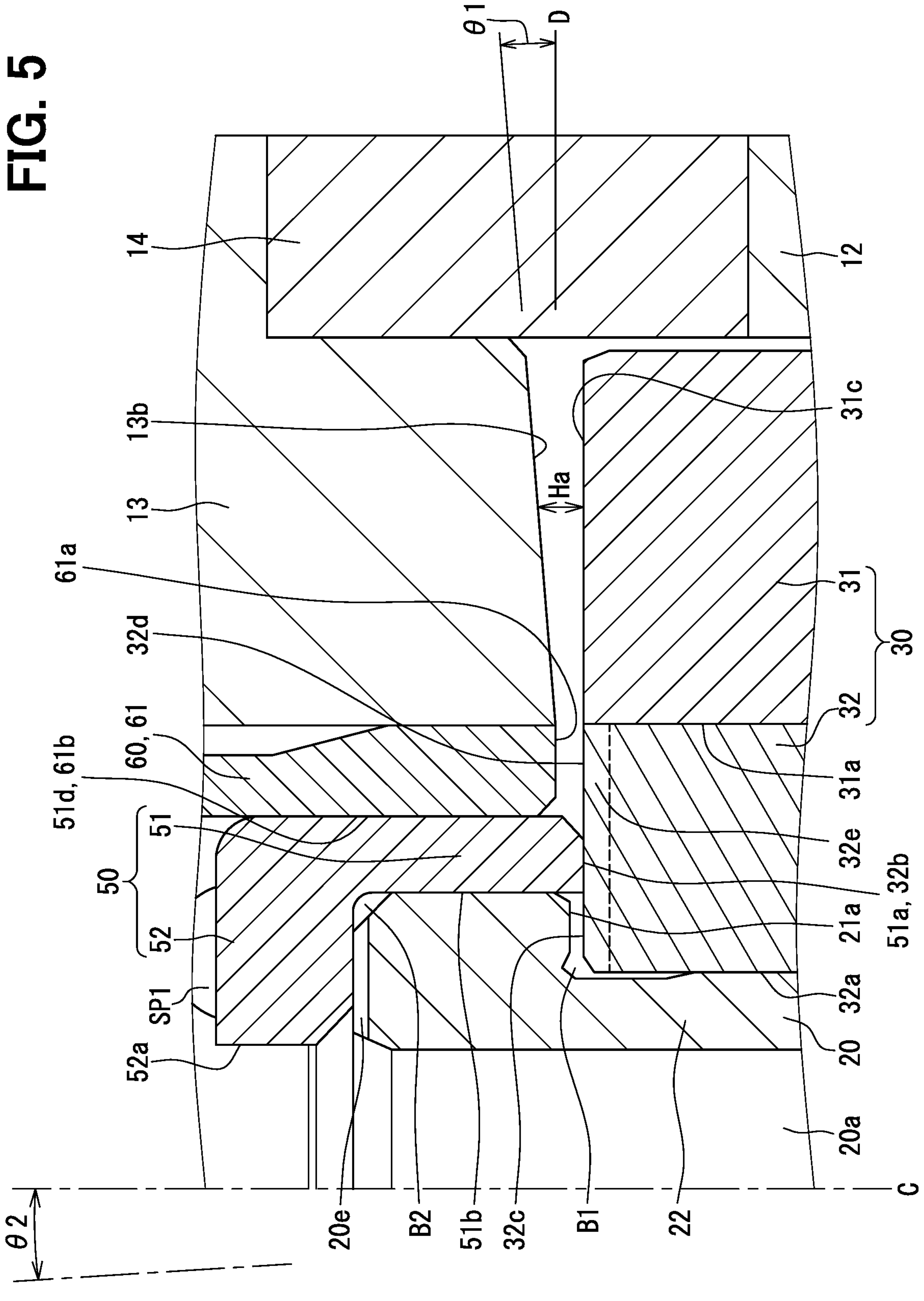
FIG. 5 is a cross-sectional view illustrating a shape of a communication groove formed in the movable core and a tapered shape of the fixed core in the first embodiment.

In a cross section including a perpendicular line D with respect to the axis line direction and the axis line C, that is, in the cross section illustrated in FIG. 5, an angle formed by the fixed core facing surface 13*b* forming the tapered shape and the perpendicular line D is referred to as a taper angle θ1. A maximum angle at which the movable core 30 can tilt with respect to the axis line C of the fixed core 13 is referred to as a maximum core tilt angle θ2. The fixed core 13 is formed such that the taper angle θ1 is larger than the maximum core tilt angle θ2.

Hereinafter, the tilt angle of the movable core 30 will be described in detail. The tilt angle of the cup 50 and the tilt angle of the needle 20 will be described in detail.

The outer peripheral surface of the guide member 60 is press-fitted into the enlarged diameter portion 13*c* of the fixed core 13. In this manner, since the guide member 60 is press-fitted and fixed to the fixed core 13, the guide member 60 does not tilt with respect to the fixed core 13. However, a dimensional tolerance of the outer peripheral surface of the guide member 60 or the inner peripheral surface of the enlarged diameter portion 13*c* is tilted.

On the other hand, since the cup 50 is slidably located with respect to the guide member 60, a gap CL1 (see FIG. 20) for sliding is formed between the cup 50 and the guide member 60. Accordingly, the cup 50 can be tilted with respect to the fixed core 13 and the guide member 60. That is, the axis line C of the cup 50 can tilt with respect to the axis line C of the fixed core 13.

Since the needle 20 is slidably located with respect to the cup 50, a gap CL2 (see FIG. 20) for sliding is formed between the needle 20 and the cup 50. Thus, the needle 20 can further tilt with respect to the tiltable cup 50. That is, the axis line C of the needle 20 can further tilt with respect to the axis line C of the tiltable cup 50.

Since the movable core 30 is slidably located with respect to the needle 20, a gap for sliding is formed between the movable core 30 and the needle 20. Thus, the movable core 30 can further tilt with respect to the tiltable needle 20. That is, the axis line C of the movable core 30 can further tilt with respect to the axis line C of the tiltable needle 20.

Therefore, in a case where the movable core 30, the needle 20, and the cup 50 are tilted to the maximum and the directions of the tilt are the same, the tilt angle of the cup 50 becomes the maximum. The maximum tilt angle of the cup 50 under this situation is referred to as a maximum cup tilt angle θ4 (see FIG. 20). The maximum tilt angle of the needle 20 under this situation is referred to as the maximum needle tilt angle, and the maximum tilt angle of the movable core 30 is referred to as the maximum core tilt angle θ2 (see FIG. 5).

An axial position of a portion of the fixed core facing surface 13*b* located on an innermost diameter side matches with an axial position of the stopper abutment end surface 61*a*. A portion of the fixed core facing surface 13*b* located on an outermost diameter side is chamfered. A portion of the separation distance Ha located radially outermost side except for the chamfered portion is referred to as an outermost separation distance. The outermost separation distance is set to a value of 1 μm or more and less than 50 μm.

In a state where the inner core 32 abuts against the guide member 60, a gap (core gap) is formed between the movable core facing surface 31*c* and the fixed core facing surface 13*b*. The smaller the volume (core gap volume) of the core gap, the larger the damper force can be. The damper force is a force that acts on the movable core 30 so that the fuel located in the gap is compressed by the movable core 30 with the valve opening operation to reduce the valve opening speed. The compressed fuel in the core gap is pushed radially outer side from the core gap, and discharged into the movable chamber 12*a* from the gap between the inner peripheral surface of the non-magnetic member 14 and the main body 12, and the outer peripheral surface of the movable core 30.

Figure 6:
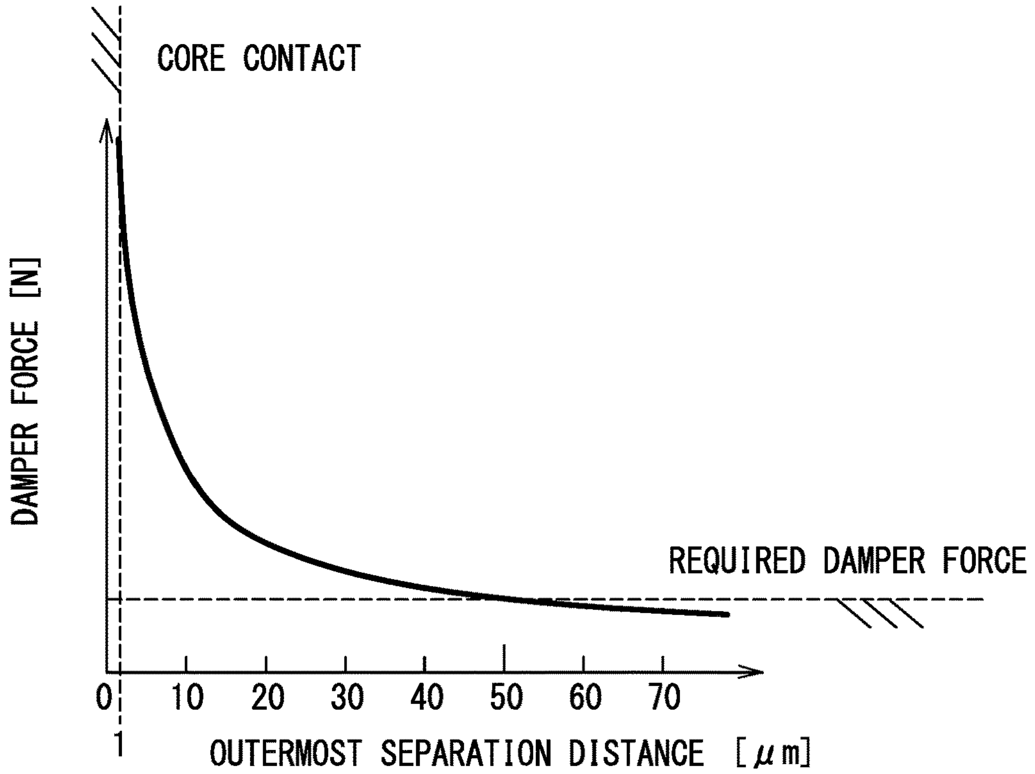
FIG. 6 is a graph illustrating a relationship between an outermost separation distance between both cores and a damper force.

FIG. 6 is a test result illustrating a relationship between the outermost separation distance and the damper force in a case where the taper angle θ1 is set to 0°. As illustrated by a solid line in the drawing, the larger the outermost separation distance, the smaller the damper force is. This is because the larger the outermost separation distance, the larger the core gap volume is. When the outermost separation distance is 50 μm or more, a behavior occurs in which the movable core 30 moved by the magnetic attraction force collides with the fixed core 13 and moves (bounces) toward the valve closing side. Therefore, it is desirable that the outermost separation distance is less than 50 μm.

The smaller the outermost separation distance, the greater the damper force is, but if it is small excessively, the outer core 31 portion of the movable core 30 comes into contact with the fixed core 13 in a case where the movable core 30 tilts at the maximum angle. Specifically, in order to avoid the above-mentioned contact, it is desirable that the outermost separation distance is 1 μm or more. In view of these points, in the present embodiment, the outermost separation distance is set to 1 μm or more and less than 50 μm.

Figure 7:
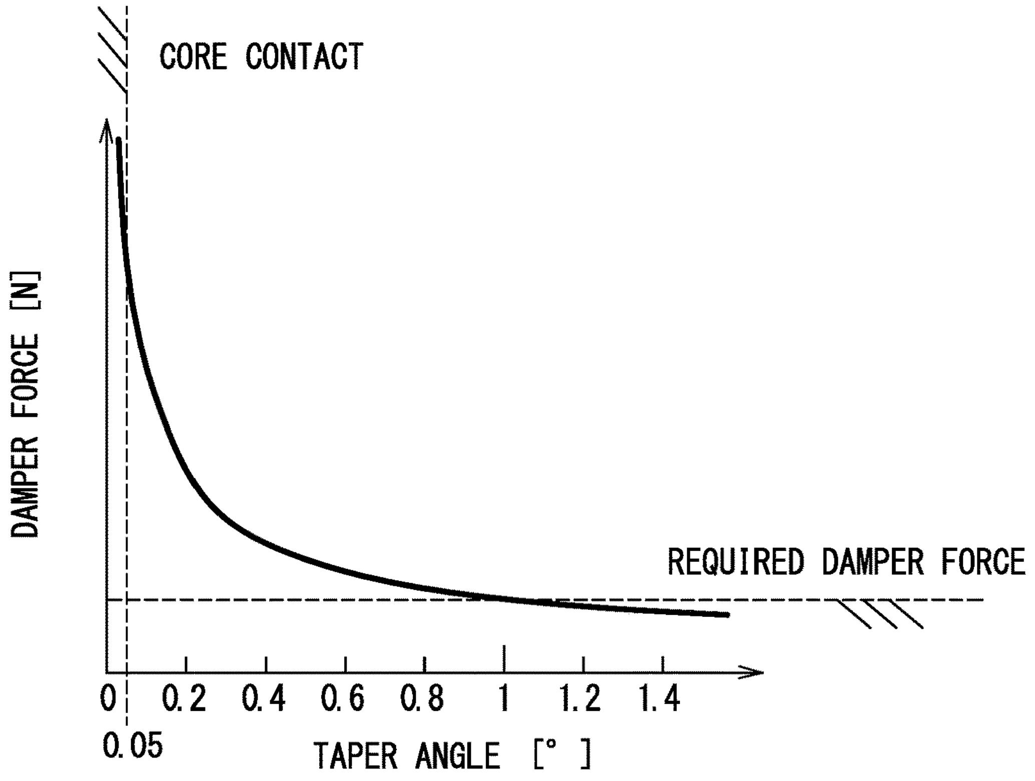
FIG. 7 is a graph illustrating a relationship between a taper angle of the fixed core and the damper force.

FIG. 7 is a test result illustrating a relationship between the taper angle θ1 and the damper force. As illustrated by a solid line in the drawing, the larger the taper angle θ1, the smaller the damper force is. This is because the larger the taper angle θ1, the larger the core gap volume is. If the taper angle θ1 is 1° or more, a behavior occurs in which the movable core 30 moved by the magnetic attraction force collides with the fixed core 13 and moves (bounces) toward the valve closing side. Therefore, it is desirable that the taper angle θ1 is less than 1°.

The smaller the taper angle θ1, the greater the damper force is, but if it is excessively small, the outer core 31 comes into contact with the fixed core 13 in a case where the movable core 30 tilts at the maximum angle. Specifically, in order to avoid the above-mentioned contact, it is desirable that the taper angle θ1 is 0.05° or more. In view of these points, in the present embodiment, the taper angle θ1 is set to 0.05° or more and less than 1°.

As described above, in the fuel injection valve 1 according to the present embodiment, the fixed core facing surface 13*b* (attracting surface) and the movable core facing surface 31*c* (attracted surface) are formed in a shape in which the separation distance Ha increases toward the radially outer side. Therefore, the above-described core gap volume can be reduced while setting the attracting surface and the attracted surface so as not to come into contact with each other in consideration of the tilt of the movable core 30. Therefore the damper force due to the compression of the fuel in the core gap can be increased and the speed at which the inner core 32 abuts (collides) against the guide member 60 can be reduced while reducing the concern of damage of the outer core 31 due to the contact. By reducing the collision speed, the bounce restriction of the movable core 30 and restriction of the damage caused by the collision between the inner core 32 and the cup 50 can be achieved.

The inner core 32 is made of a material having a higher hardness than that of the outer core 31 in consideration of abrasion resistance. In other words, the outer core 31 is made of a material that gives priority to high magnetism over abrasion resistance. Therefore, according to the present embodiment in which the outer core 31 is set so as not to come into contact with the fixed core 13 as described above, both the reduction of the concern of the damage caused by the contact of the outer core 31 and the increase of the magnetic attraction force can be achieved.

Figure 8:
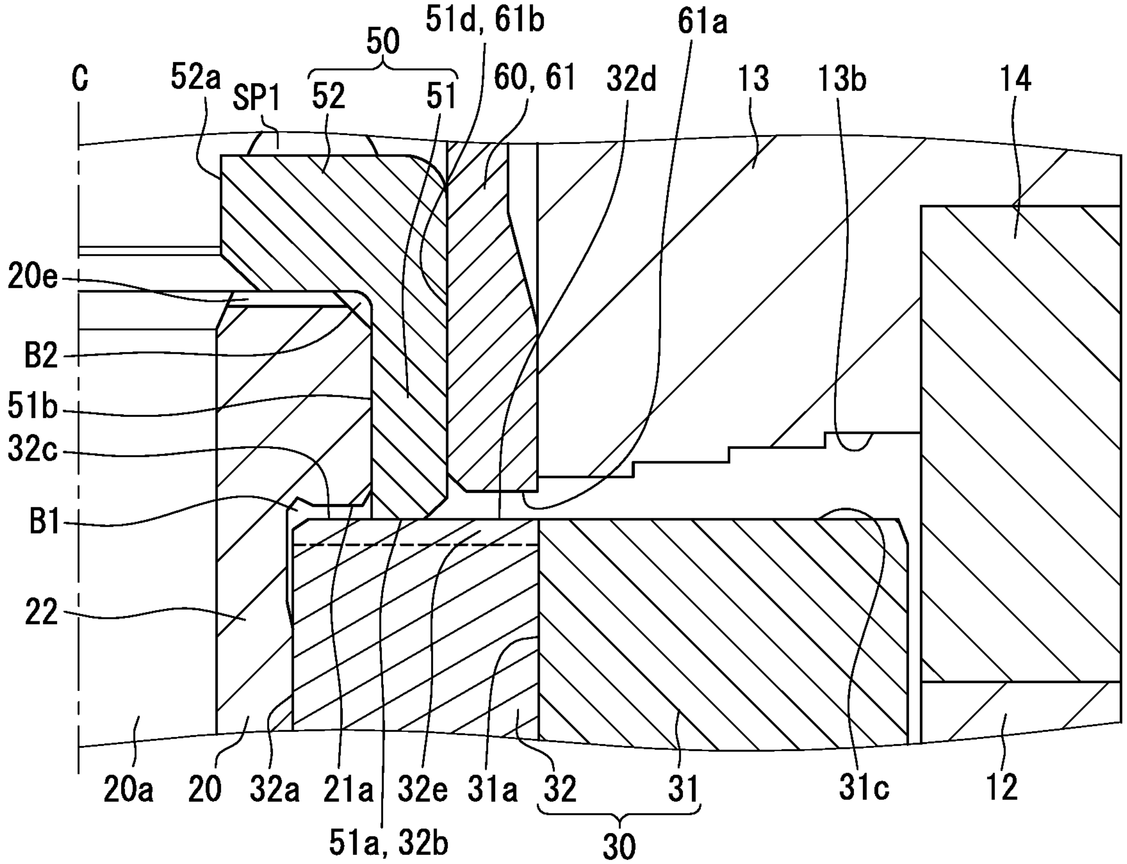
FIG. 8 is a cross-sectional view illustrating a modification A1 with respect to FIG. 5.

In the present embodiment, the fixed core facing surface 13*b* (attracting surface) is formed in a tapered shape inclining in the direction in which the separation distance Ha increases toward the radially outer side. Therefore, the core gap volume can be further reduced as compared with the case where the step shape illustrated in FIG. 8 is formed, and the increase of the damper force can be promoted.

In the present embodiment, the taper angle θ1 of the movable core facing surface 31*c* is larger than the maximum angle that is, the maximum core tilt angle θ2 at which the movable core 30 can tilt. Therefore, it is possible to improve the reliability of preventing the outer core 31 from coming into contact with the fixed core 13.

In the present embodiment, the movable core 30 and the main body 12 are configured such that the fuel pushed out from the core gap with the valve opening operation is discharged from the gap between the outer peripheral surface of the movable core 30 and the inner peripheral surface of the main body 12. The attracting surface is formed in a tapered shape, and the attracted surface is formed in a flat shape extending in the perpendicular line D direction.

The fuel pushed out from the core gap is then discharged to the movable chamber 12*a* through the gap (gap between the core bodies) between the movable core 30 and the main body 12. Therefore, the longer the flow path of the gap between the core bodies, the greater the pressure loss of the fuel flowing through the gap between the core bodies can be.

That is, the fuel can be prevented from flowing through the gap between the core bodies and the damper force can be increased. In view of this point, in the present embodiment, the attracting surface is formed in a tapered shape, and the attracted surface is formed in a flat shape extending in the perpendicular line D direction. Therefore, as compared with a case where the attracted surface is formed in a tapered shape contrary to the present embodiment, the flow path of the gap between the core bodies can be lengthened, so that the damper force can be increased.

In the present embodiment, the separation distance Ha of a portion located radially outermost side is 1 μm or more and less than 50 μm. Therefore, as described above with reference to FIG. 6, while avoiding the contact between the outer core 31 and the fixed core 13, it is possible to promote the increase of the damper force by reducing the core gap volume.

In the present embodiment, the taper angle θ1 is 0.05° or more and less than 1°. Therefore, as described above with reference to FIG. 7, while avoiding the contact between the outer core 31 and the fixed core 13, it is possible to promote the increase of the damper force by reducing the core gap volume.

In the present embodiment, the movable core 30 is assembled to the needle 20 in a relatively movable state in the axis line C direction. Therefore, the movable core 30 tends to tilt as much as the sliding gap between the movable core 30 and the needle 20 is formed. In the configuration in which the movable core 30 easily tilts, that is, the configuration in which the movable core 30 easily comes into contact with the fixed core 13, according to the present embodiment adopting the tapered shape described above, the above-mentioned effect of avoiding contact by tilting in the tapered shape is remarkably exhibited.

In the present embodiment, the movable core 30 is configured to engage with the needle 20 and initiate the valve opening operation when the movable core 30 moves the gap amount L1 (predetermined amount) to the side opposite to the nozzle hole. Therefore, the movable core 30 tends to tilt as much as the sliding gap between the cup 50 and the needle 20 is formed. In the configuration in which the movable core 30 easily tilts, that is, the configuration in which the movable core 30 easily comes into contact with the fixed core 13, according to the present embodiment adopting the tapered shape described above, the above-mentioned effect of avoiding contact by tilting in the tapered shape is remarkably exhibited.

[Modification A1]

In the example illustrated in FIG. 5, in order to realize a configuration in which the separation distance Ha is larger toward the radially outer side, the fixed core facing surface 13*b* (attracting surface) has a tapered shape in which the separation distance Ha is gradually increased. On the other hand, as illustrated in FIG. 8, the fixed core facing surface 13*b* (attracting surface) may have a step shape in which the separation distance Ha is increased in a step shape.

Specifically, the fixed core facing surface 13*b* has multiple flat surfaces parallel to the perpendicular line D, and these flat surfaces are located so that an axial position is shifted to increase the separation distance Ha toward the radially outer side.

Even with such a step shape, the core gap volume can be reduced and the damper force can be increased while the attracting surface and the attracted surface are set so as not to come into contact with each other in consideration of the tilt of the movable core 30.

[Modification A2]

In the example illustrated in FIG. 5, the movable core 30 is configured by assembling the outer core 31 and the inner core 32 of different materials. On the other hand, the outer core 31 and the inner core 32 may be formed of one base material, and the outer core 31 and the inner core 32 may be made of the same material. In this case, it is desirable in that if plating is applied to the surface of the inner core 32, the abrasion resistance of the inner core 32 can be improved. However, if plating is applied to the outer core 31, swell relating to the roughness of the movable core facing surface 31*c* increases, which may cause a reduction of damper force. Therefore, it is desirable that the plating is not applied to the outer core 31.

[Modification A3]

In the example illustrated in FIG. 5, by forming the fixed core facing surface 13*b* in a tapered shape, the increase of the separation distance Ha toward the radially outer side is realized. On the other hand, by forming the movable core facing surface 31*c* in a tapered shape, the increase of the separation distance Ha toward the radially outer side may be realized. Alternatively, both the fixed core facing surface 13*b* and the movable core facing surface 31*c* may have the tapered shape.

Similarly, as illustrated in FIG. 8, by forming the fixed core facing surface 13*b* in the step shape, the movable core facing surface 31*c* may be formed in the step shape instead of realizing that the separation distance Ha increases toward the radially outer side. Alternatively, both the fixed core facing surface 13*b* and the movable core facing surface 31*c* may have the step shape.

<Detailed Description of Configuration Group B>

Next, among the configurations of the fuel injection valve 1 according to the present embodiment, a configuration group B including at least a fuel storage chamber B1 and a configuration related to the fuel storage chamber B1 described below among the configurations included in the fuel injection valve 1 according to the present embodiment will be described in detail with reference to FIGS. 5, 9, and 10. A modification of the configuration group B will be described later with reference to FIGS. 11 to 19.

As illustrated in FIG. 5, the fuel storage chamber B1 is a portion in which fuel surrounded by the movable core 30, the cup 50, and the needle 20 is stored. In the following description, of the surface of the inner core 32 on the side opposite to the nozzle hole, a surface which abuts against the needle 20, is referred to as a first core abutment surface 32*c*, a surface, which abuts against the cup 50, is referred to as a second core abutment surface 32*b*, and a surface, which abuts against the guide member 60, is referred to as a third core abutment surface 32*d*.

Since the movable core 30 is urged to the cup 50 by the second elastic force, the movable core 30 always abuts against the cup 50 except when the movable core 30 is inertially moved after the valve is closed and separated from the cup 50. Specifically, the second core abutment surface 32*b* of the inner core 32 always abuts against the core abutment end surface 51*a* of the cup 50. The cylindrical portion 51 of the cup 50, which forms the core abutment end surface 51*a*, partitions the inside and the outside of the fuel storage chamber B1. The outside is a region where fuel exists radially outer side the outer peripheral surface 51*d* of the cup 50, the first core abutment surface 32*c* is located inside the fuel storage chamber B1, and the third core abutment surface 32*d* is located outside the fuel storage chamber B1.

The fuel storage chamber B1 is a region surrounded by the outer peripheral surface of the core sliding portion 22 of the needle 20, the valve body abutment surface 21*a* at the time of valve opening, the inner wall surface of the through-hole 32*a* of the inner core 32, the first core abutment surface 32*c*, and the inner peripheral surface of the cylindrical portion 51 of the cup 50. The fuel storage chamber B1 is a region surrounded as described above in a state where the movable core 30 and the cup 50 abut against each other. The fuel storage chamber B1 is a region surrounded as described above in a state where the valve body-side seat 20*s* abuts against the body-side seat 11*s* and the needle 20 is closed.

A communication groove 32*e* is formed in the first core abutment surface 32*c* and the second core abutment surface 32*b* of the inner core 32. The communication groove 32*e* communicates the inside and the outside of the fuel storage chamber B1 in a state where the second core abutment surface 32*b* abuts against the core abutment end surface 51*a*. The outside is a space different from the fuel storage chamber B1 when the cup 50 and the movable core 30 abut against each other.

The outside of the fuel storage chamber B1 corresponds to a region exemplified below. That is, a first region between the stopper abutment end surface 61*a* of the guide member 60 and the third core abutment surface 32*d* corresponds to the outside. The first region is a region formed in a state where the cup 50 and the movable core 30 abut against each other, and the movable core 30 and the guide member 60 do not abut against each other. A surface of the fixed core 13 facing the movable core 30 is referred to as the fixed core facing surface 13*b*. A surface of the outer core 31 facing the fixed core 13 is referred to as the movable core facing surface 31*c*. A second region, which is a region communicating with the first region, between the fixed core facing surface 13*b* and the movable core facing surface 31*c*, which is a region communicating with the first region, corresponds to the outside. A third region, which is a region communicating with the second region, between the inner peripheral surfaces of the main body 12 (holder) and the non-magnetic member 14 (holder), and the outer peripheral surface of the outer core 31 corresponds to the outside.

Figure 9:
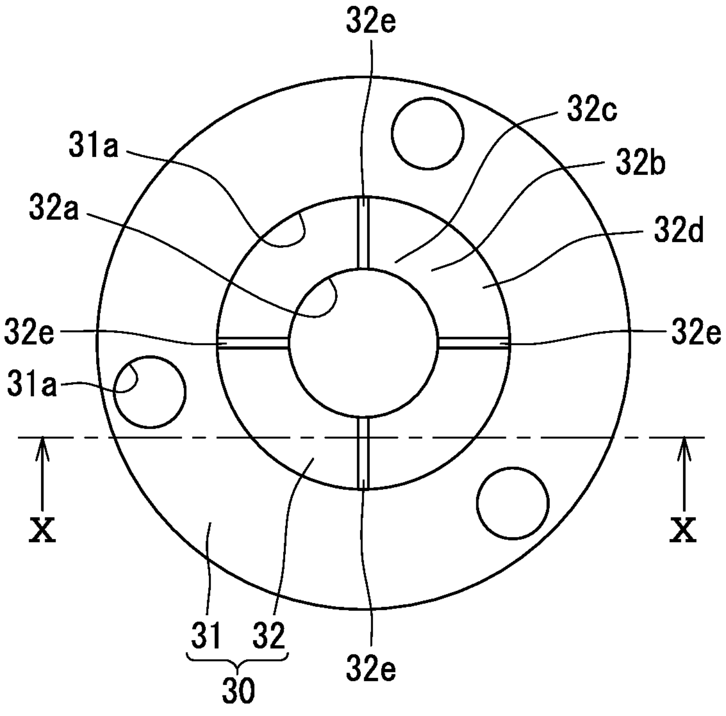
FIG. 9 is a top view of the movable core illustrated in FIG. 5 as seen from a side opposite to a nozzle hole.

As illustrated in FIG. 9, multiple (for example, four) communication grooves 32*e* are formed, and the multiple communication grooves 32*e* are located at equal intervals in the circumferential direction when viewed from the moving direction of the movable core 30. The communication groove 32*e* has a shape linearly extending in the radial direction. Each of the multiple communication grooves 32*e* has the same shape. A circumferential position of the communication groove 32*e* is different from a circumferential position of the through-hole 31*a*.

The inner core 32 functions as an "abutment portion" in which the first core abutment surface 32*c* and the second core abutment surface 32*b* are formed. The outer core 31 functions as a "core body portion" made of a material different from that of the inner core 32, on which a movable core facing surface 31*c* facing the fixed core 13 is formed. The core body portion is excluded from a forming range of the communication groove 32*e*. That is, the communication groove 32*e* is formed in the inner core 32 but is not formed in the outer core 31.

The communication groove 32*e* is formed over the entire region of the inner core 32 in the radial direction, and is formed over from the inner peripheral surface to the outer peripheral surface of the inner core 32. That is, the communication groove 32*e* is formed over the entire region of the first core abutment surface 32*c*, the second core abutment surface 32*b*, and the third core abutment surface 32*d* in the radial direction.

Figure 10:
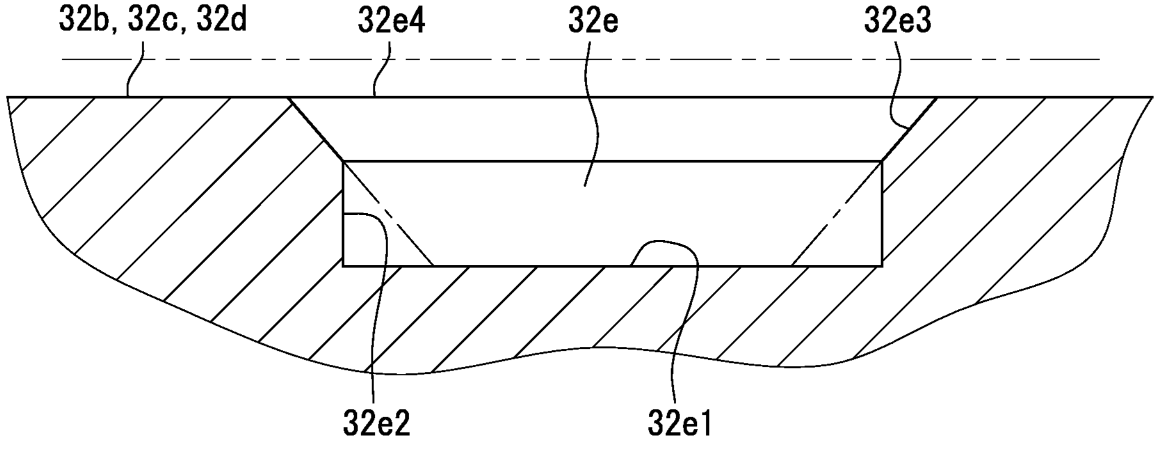
FIG. 10 is a cross-sectional view which is taken along line X-X of FIG. 9.

As illustrated in FIG. 10, the communication groove 32*e* has a bottom wall surface 32*e*1, a vertical wall surface 32*e*2, and a tapered surface 32*e*3. The bottom wall surface 32*e*1 has a shape extending perpendicularly to the moving direction of the movable core 30. The vertical wall surface 32*e*2 has a shape extending from the bottom wall surface 32*e*1 in the moving direction of the movable core 30. The tapered surface 32*e*3 has a shape extending from the vertical wall surface 32*e*2 toward the groove opening 32*e*4 while increasing a flow area. In the example illustrated in FIG. 10, the tapered surface 32*e*3 has a shape linearly extending from an upper end of the vertical wall surface 32*e*2.

Examples of a method of processing the communication groove 32*e* include laser processing, electric discharge processing, cutting with an end mill, and the like. First, a groove having a rectangular cross-sectional shape including the vertical wall surface 32*e*2 and the bottom wall surface 32*e*1 is processed. At this time point, burr generated at the time of processing may remain in a peripheral portion of the groove opening 32*e*4 in the vertical wall surface 32*e*2. After that, however, by processing the tapered surface 32*e*3 having a trapezoidal cross-sectional shape, the burr is removed.

When the fuel existing in the fuel storage chamber B1 is compressed as the movable core 30 moves to the side opposite to the nozzle hole, the movable core 30 is prevented from moving, so that the travel speed (collision speed) when the movable core 30 moves by a predetermined amount and abuts against the needle 20 is slow. As a result, the above-mentioned effect of the core boost structure, that is, the effect that "the valve body can perform the valve opening operation even with the high-pressure fuel while restricting the increase of the magnetic attraction force required to open the valve" is reduced. Since the movement of the movable core 30 is hindered, a variation in the valve opening timing of the needle 20 is large, and a variation in the fuel injection amount is large.

To cope with these problems, the fuel injection valve 1 according to the present embodiment includes the needle 20 (valve body), the fixed core 13, the movable core 30, the first spring member SP1 (spring member), and the cup 50 (valve closing force transmission member). The movable core 30 abuts against the needle 20 at a time point when the movable core 30 is attracted by the fixed core 13 and moved by a predetermined amount to the side opposite to the nozzle hole, and causes the needle 20 to perform the valve opening operation. The first spring member SP1 is elastically deformed in accordance with the valve opening operation of the needle 20, and exhibits a valve closing elastic force for causing the needle 20 to perform the valve closing operation. The cup 50 is located so as to be movable with respect to the needle 20, and abuts against the needle 20 when moving with respect to the nozzle hole side to transmit the valve closing elastic force to the needle 20. The movable core 30 has the first core abutment surface 32*c* and the second core abutment surface 32*b*, and the communication groove 32*e* is formed in the first core abutment surface 32*c* and the second core abutment surface 32*b* to communicate the inside and the outside of the fuel storage chamber B1.

Therefore, when the movable core 30 moves to the side opposite to the nozzle hole, the fuel stored in the fuel storage chamber B1 flows out to the outside through the communication groove 32*e*. Therefore, the compression of the fuel stored in the fuel storage chamber B1 is restricted, so that the movable core 30 easily moves. Therefore, the reduction of the collision speed of the movable core 30 can be restricted, so that the effect of reducing the magnetic attraction force by the core boost structure can be promoted. Since the movable core 30 easily moves, the variation in the valve opening timing of the needle 20 can be restricted, and consequently, the variation in the fuel injection amount can be restricted.

In the fuel injection valve 1 according to the present embodiment, multiple communication grooves 32*e* are formed, and the multiple communication grooves 32*e* are located at equal intervals in the circumferential direction when viewed from the moving direction of the movable core 30.

According to this configuration, portions, in which the fuel easily flow out from the fuel storage chamber B1 to the outside, exist at equal intervals around the axis line direction. Therefore, when the movable core 30 moves in the axis line direction, a change in the tilt direction of the movable core 30 with respect to the axis line direction can be restricted. Therefore, since the behavior of the movable core 30 can be restricted from becoming unstable, the variation in the valve opening responsiveness can be further restricted. If three or more communication grooves 32*e* are formed at equal intervals in the circumferential direction, the effect reducing the behavior unstable is promoted.

In the fuel injection valve 1 according to the present embodiment, the movable core 30 includes the inner core 32 (abutment portion) and the outer core 31 (core body portion) made of a material different from that of the inner core 32. The inner core 32 is formed with the first core abutment surface 32*c* and the second core abutment surface 32*b*, and the outer core 31 is formed with the movable core facing surface 31*c* facing the fixed core 13. The outer core 31 is excluded from the formation range of the communication groove 32*e*.

According to this, since the movable core facing surface 31*c* of the outer core 31 can have a flat shape having no groove, the reduction of the magnetic attraction force attracted to the fixed core 13 by the communication groove can be restricted.

In the fuel injection valve 1 according to the present embodiment, the third core abutment surface 32*d* of the movable core 30, which abuts against the guide member 60, is located outside the fuel storage chamber B1. The communication groove 32*e* is also formed in the third core abutment surface 32*d* in addition to the first core abutment surface 32*c* and the second core abutment surface 32*b*.

In a state where the needle 20 is in the full lift position, the inner core 32 abuts against the guide member 60. In this abutting state, if the stopper abutment end surface 61*a* of the guide member 60 and the third core abutment surface 32*d* of the inner core 32 are in close contact with each other, there is a concern that a phenomenon (linking phenomenon) occurs in which the third core abutment surface 32*d* is hardly separated from the stopper abutment end surface 61*a*. To cope with this concern, in the present embodiment, since the communication groove 32*e* is also formed in the third core abutment surface 32*d*, when the movable core 30 initiates the movement to the nozzle hole side with the energization OFF, the fuel is supplied to the third core abutment surface 32*d* in a state of abutting against the stopper abutment end surface 61*a*. Therefore, since the movable core 30 can be restricted from being in close contact with the guide member 60 and from being difficult to separate, the possibility that the initiation of the movement of the movable core 30 to the nozzle hole side is delayed due to the above-mentioned close contact force can be reduced. Therefore, the valve closing response time from when the energization is turned off to when the needle 20 is closed can be shortened, and the valve closing responsiveness can be improved.

In the fuel injection valve 1 according to the present embodiment, the communication groove 32*e* has the bottom wall surface 32*e*1 extending perpendicularly to the moving direction of the movable core 30 and the vertical wall surface 32*e*2 extending from the bottom wall surface 32*e*1 in the moving direction.

In order to remove the burr generated in the groove opening 32*e*4 of the communication groove 32*e*, it is desirable to polish the first core abutment surface 32*c* and the second core abutment surface 32*b*. For example, polishing is performed from a position indicated by a two-dot chain line to a position indicated by a solid line in FIG. 10. In the present embodiment, after the inner core 32 is assembled to the outer core 31, the communication groove 32*e* and the outer communication groove 31*e* are formed by cutting or the like, and after that, the above-mentioned polishing is performed on both the outer core 31 and the inner core 32 simultaneously.

Contrary to the present embodiment, in a case where the vertical wall surface 32*e*2 is not provided and the shape is illustrated by a one-dot chain line, the cross-sectional area of the communication groove 32*e* is small, and a ratio of a cross-sectional area to be polished to the cross-sectional area of the communication groove 32*e* is large. As a result, the influence of variation in a polishing depth on the cross-sectional area of the communication groove 32*e* is large, so that the variation in the cross-sectional area of the communication groove 32*e* is large. Therefore, variation in a degree of the fuel flowing out from the fuel storage chamber B1 to the outside through the communication groove 32*e* is large, and the variation in the ease of movement of the movable core 30 is large, which hinders the restriction of the variation in the valve opening timing of the needle 20. On the other hand, in the present embodiment, since the vertical wall surface 32*e*2 is provided, the ratio of the cross-sectional area to be polished is small, and the influence of the variation in the polishing depth on the cross-sectional area of the communication groove 32*e* is small. Therefore, variation in the degree of the fuel flowing out from the fuel storage chamber B1 to the outside through the communication groove 32*e* can be reduced, and the variation in the valve opening timing of the needle 20 can be promoted.

[Modification B1]

Figure 11:
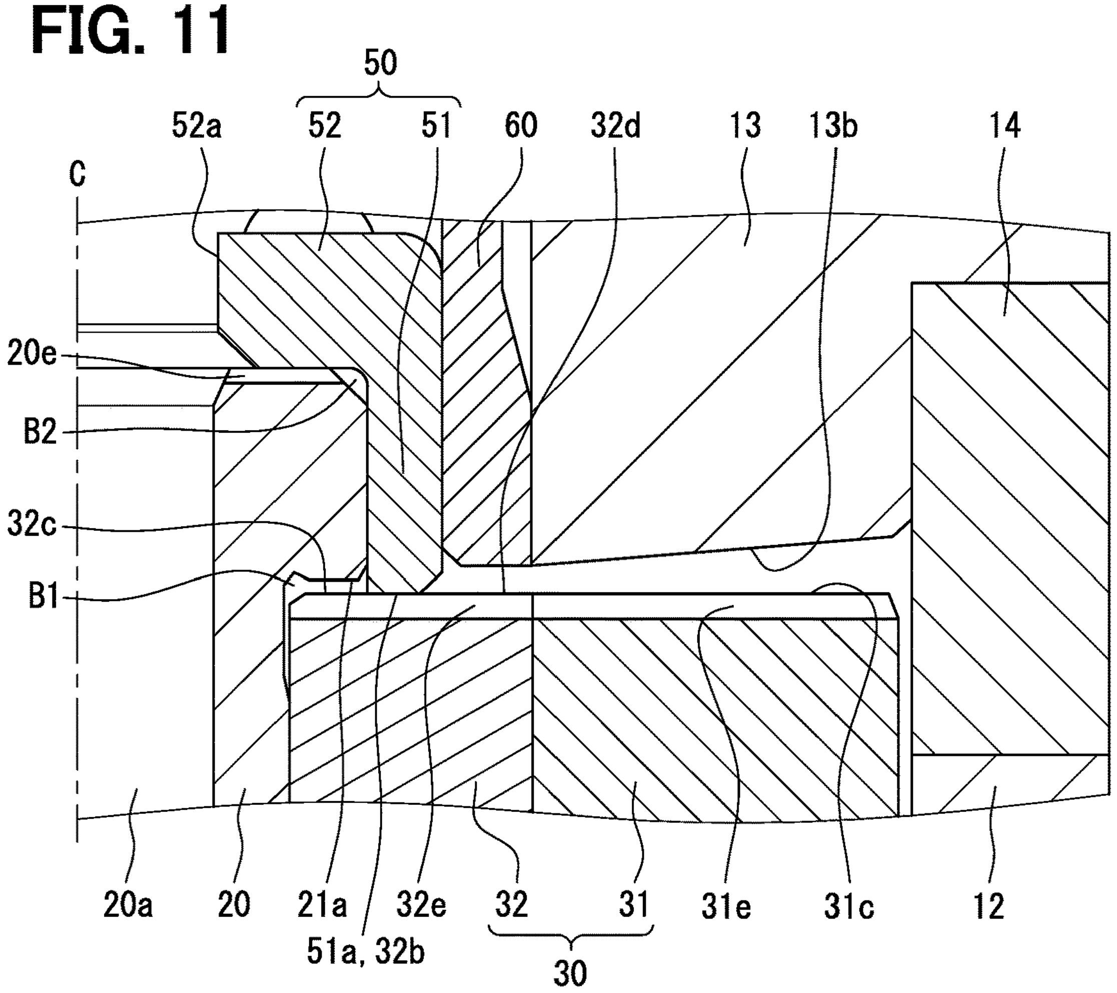
FIG. 11 is a cross-sectional view illustrating a modification B1 with respect to FIG. 5.

Although the communication groove 32*e* illustrated in FIG. 5 is not formed in the outer core 31, as illustrated in FIG. 11, a communication groove (outer communication groove 31*e*) may be formed in the outer core 31 in addition to the communication groove 32*e* formed in the inner core 32. In the example illustrated in FIG. 11, an inner diameter side end portion of the outer communication groove 31*e* directly communicates with an outer diameter side end portion of the communication groove 32*e*.

Figure 12:
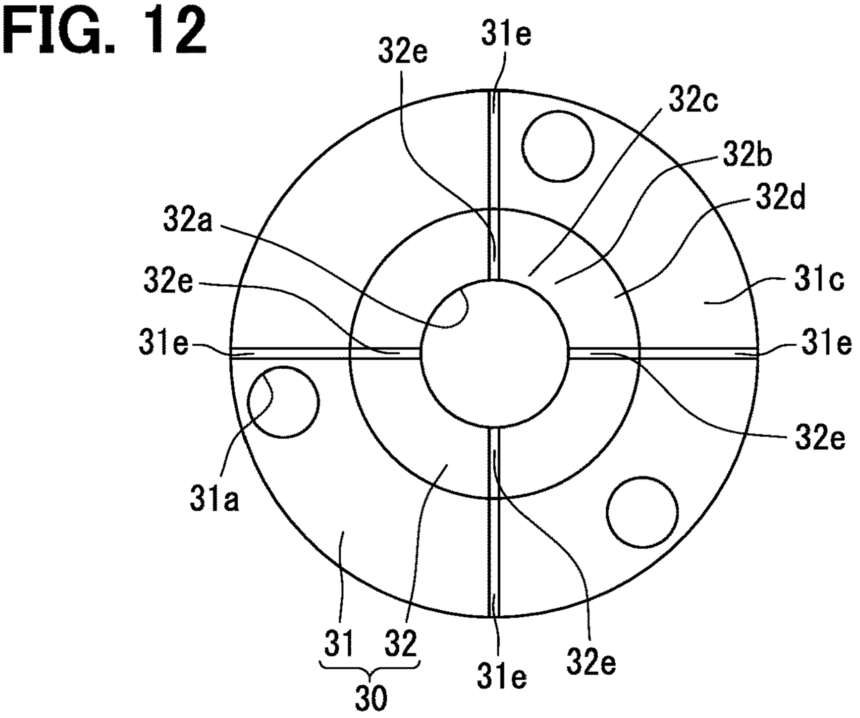
FIG. 12 is a top view of the movable core illustrated in FIG. 11 as seen from the side opposite to the nozzle hole.

As illustrated in FIG. 12, multiple (for example, four) outer communication grooves 31*e* are formed, and multiple outer communication grooves 31*e* are located at equal intervals in the circumferential direction when viewed from the moving direction of the movable core 30. The outer communication groove 31*e* has a shape linearly extending in the radial direction. Each of the multiple outer communication grooves 31*e* has the same shape. A circumferential position of the outer communication groove 31*e* is different from a circumferential position of the through-hole 31*a*.

The outer communication groove 31*e* and the communication groove 32*e* have the same circumferential position. In the example of FIG. 12, four outer communication grooves

31*e* are located at equal intervals in the circumferential direction, but six outer communication grooves 31*e* may be located at equal intervals in the circumferential direction. In this case, it is desirable to set the circumferential position of the through-hole 31*a* such that a circumferential distance to the adjacent outer communication groove 31*e* is the same.

The outer communication groove 31*e* is formed over the entire region of the outer core 31 in the radial direction, and is formed over from the inner peripheral surface to the outer peripheral surface of the outer core 31. That is, the outer communication groove 31*e* is formed over the entire region of the movable core facing surface 31*c* in the radial direction. A cross-sectional shape of the outer communication groove 31*e* is the same as the cross-sectional shape of the communication groove 32*e* illustrated in FIG. 10, and the outer communication groove 31*e* has the same bottom wall surface, vertical wall surface, and tapered surface as those of the communication groove 32*e*. As described above, FIG. 10 is a cross-sectional view which is taken along line X-X of FIG. 9, and illustrates a shape of the cross section of the communication groove 32*e* extending in the radial direction of the movable core 30, which is taken perpendicular to an extending direction. The cross-sectional shape of the outer communication groove 31*e* is also the same as that of the communication groove 32*e*, and is a shape of the cross section having a bottom wall surface, a vertical wall surface, and a tapered surface in a cross-section which is taken perpendicularly to the extending direction of the outer communication groove 31*e*.

As described above, according to the present modification having the outer communication groove 31*e*, since the fuel flowing out from the outer diameter side end portion of the communication groove 32*e* is diffused through the outer communication groove 31*e*, the increase in the fuel pressure at the outer diameter side end portion of the communication groove 32*e* can be restricted, and the fuel outflow through the communication groove 32*e* can be promoted. That is, an increase in the fuel pressure between the guide member 60 and the inner core 32 can be restricted.

In the present modification, since the inner diameter side end portion of the outer communication groove 31*e* directly communicates with the outer diameter side end portion of the communication groove 32*e*, the fuel outflow from the outer diameter side end portion can be further promoted.

In the present modification, since the outer communication groove 31*e* is formed over the entire region in the radial direction of the movable core facing surface 31*c*, the fuel flowing out from the outer diameter side end portion of the outer communication groove 31*e* directly flows into the gap between the inner peripheral surface of the holder and the outer peripheral surface of the outer core 31. Therefore, an increase in the fuel pressure at the outer diameter side end portion of the outer communication groove 31*e* can be restricted, and the fuel outflow through the communication groove 32*e* and the outer communication groove 31*e* can be promoted.

In the present modification, with respect to a dimension of the outer communication groove 31*e*, a width dimension (circumferential dimension) of a portion of the outer communication groove 31*e*, which opens toward the fixed core 13 is set smaller than a depth dimension (axis line C direction dimension) of the outer communication groove 31*e*. According to this, the flow channel cross-sectional area of the outer communication groove 31*e* can be increased while restricting the reduction of the area of the movable core facing surface 31*c* caused by the formation of the outer communication groove 31*e*. The "flow channel cross-sectional area" is an area of a cross section perpendicular to the flow direction when the fuel in the fuel storage chamber B1 flows radially outer side through the outer communication groove 31*e*. That is, since the width dimension is smaller than the depth dimension as described above, the fuel discharge from the fuel storage chamber B1 at the time of the valve opening operation can be realized while restricting the reduction of the magnetic attraction force.

[Modification B2]

Figure 13:
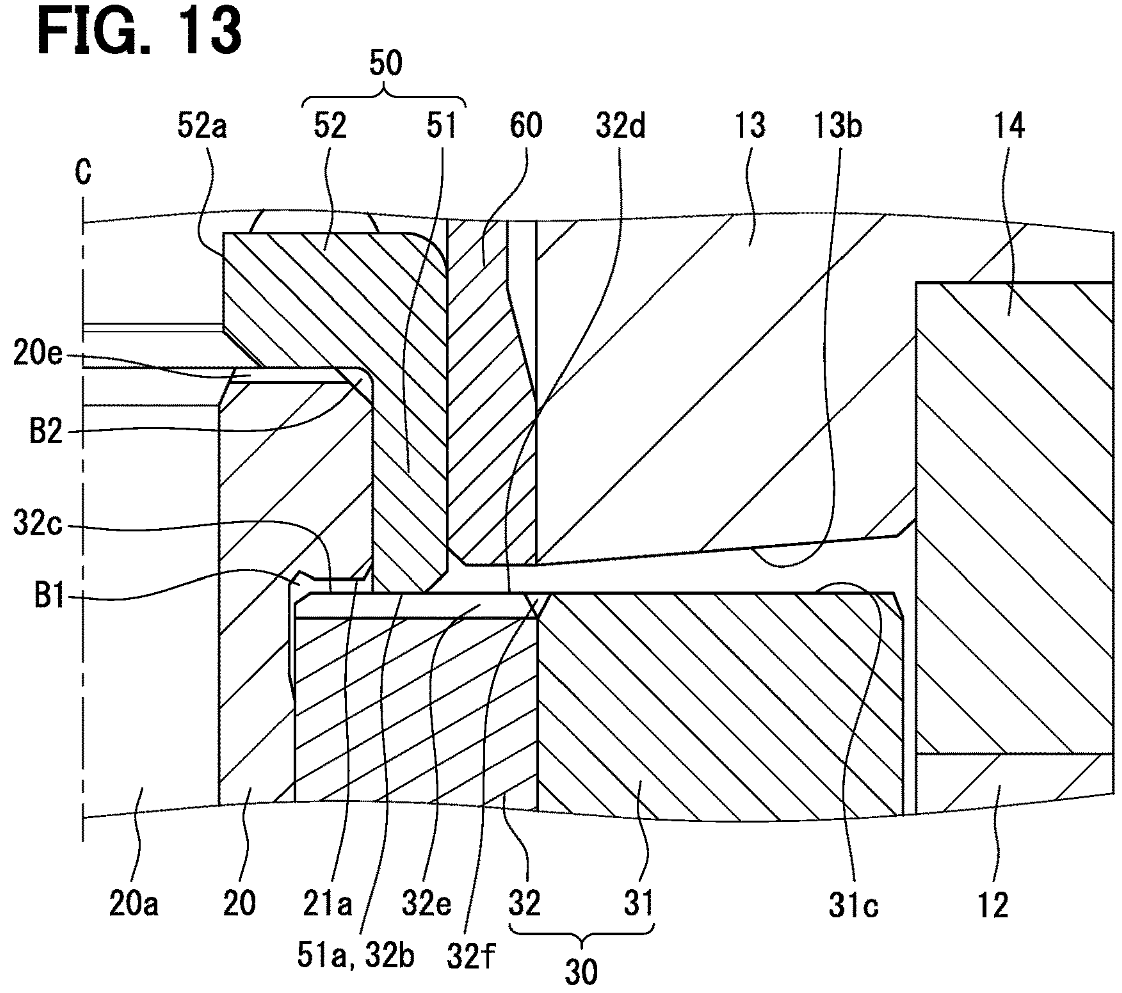
FIG. 13 is a cross-sectional view illustrating a modification B2 with respect to FIG. 5.
Figure 14:
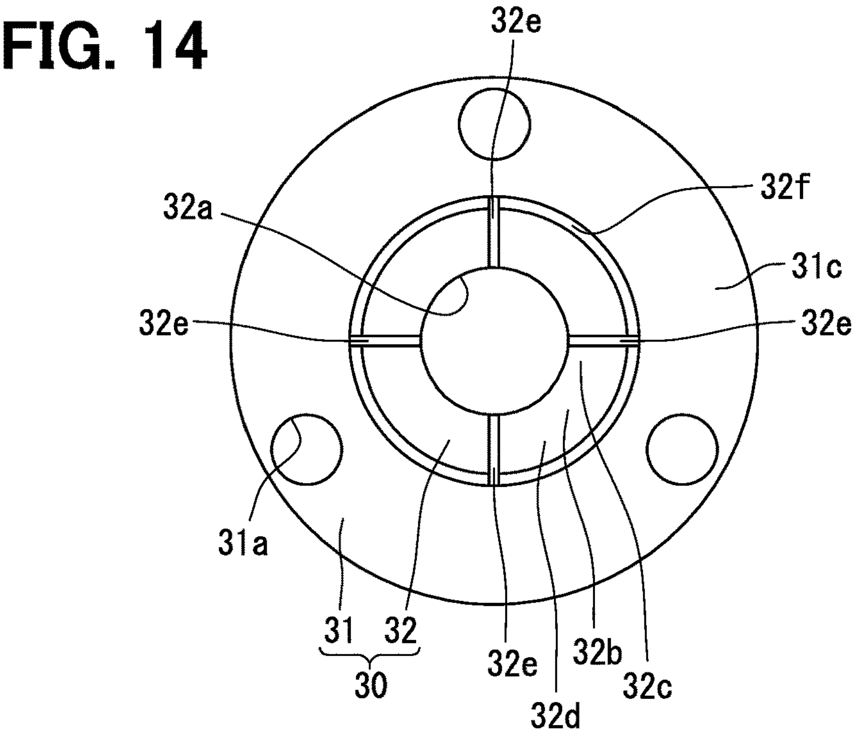
FIG. 14 is a top view of the movable core illustrated in FIG. 13 as seen from the side opposite to the nozzle hole.

In the present modification illustrated in FIGS. 13 and 14, a coupling groove 32*f* for coupling the multiple communication grooves 31*e* is formed. The coupling groove 32*f* has a shape extending annularly around the through-hole 32*a*, and couples all (four in the example of FIG. 14) communication grooves 31*e*. The coupling groove 32*f* couples the outer diameter side end portion of the communication groove 31*e*. The coupling groove 32*f* is formed by cutting an outer diameter side corner portion of the inner core 32. By cutting an inner diameter side corner portion of the outer core 31, the coupling groove 32*f* is formed to extend across both the outer core 31 and the inner core 32.

Also in the embodiment illustrated in FIGS. 11 and 12, the coupling groove 32*f* illustrated in FIGS. 13 and 14 may be formed, and each of multiple communication grooves 32*e* and multiple outer communication grooves 31*e* may be coupled by the coupling groove 32*f*.

As described above, according to the present modification having the coupling groove 32*f*, since the fuel flowing out from the outer diameter side end portion of the communication groove 32*e* is diffused through the coupling groove 32*f*, the increase in the fuel pressure at the outer diameter side end portion of the communication groove 32*e* can be restricted, and the fuel outflow through the communication groove 32*e* can be promoted.

By coupling the multiple communication grooves 31*e*, the fuel flowing out uniformly from the multiple communication grooves 31*e* can be promoted, and therefore, a change in the tilt direction of the movable core 30 with respect to the axis line direction can be restricted when the movable core 30 moves in the axis line direction. Therefore, since the behavior of the movable core 30 can be restricted from becoming unstable, the variation in the valve opening responsiveness can be further restricted.

[Modification B3]

Figure 15:
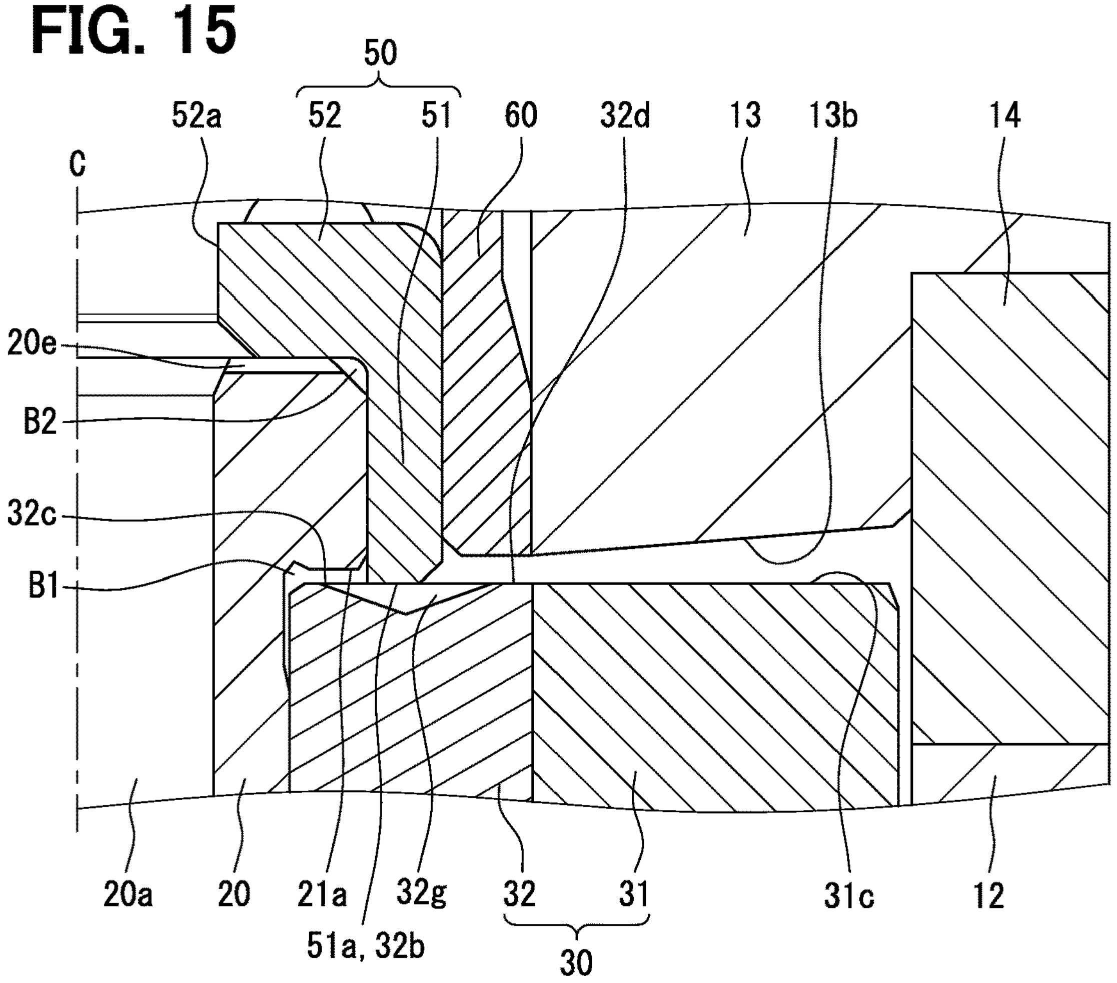
FIG. 15 is a cross-sectional view illustrating a modification B3 with respect to FIG. 5.
Figure 16:
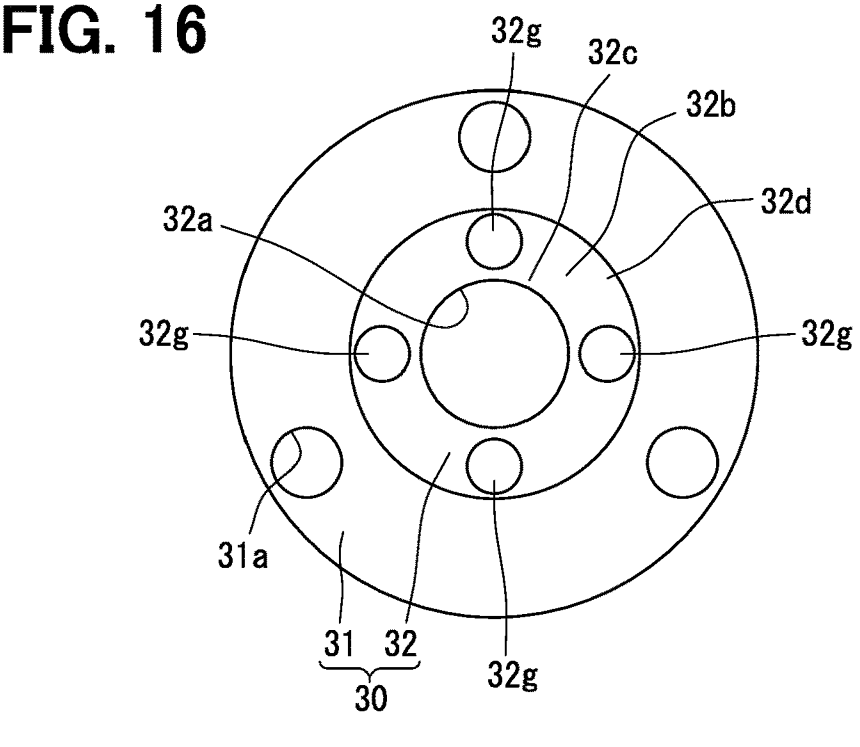
FIG. 16 is a top view of the movable core illustrated in FIG. 15 as seen from the side opposite to the nozzle hole.

The communication groove 32*e* illustrated in FIG. 5 is formed over the entire region of the end surface of the inner core 32. On the other hand, the communication groove 32*g* of the present modification illustrated in FIGS. 15 and 16 is formed across a part of the first core abutment surface 32*c*, the entire region of the second core abutment surface 32*b*, and a part of the third core abutment surface 32*d*. More specifically, the communication groove 32*g* is not formed over the entire region of the first core abutment surface 32*c* in the radial direction, and is partially formed at a portion of the first core abutment surface 32*c* adjacent to the second core abutment surface 32*b*. The communication groove 32*g* is formed over the entire region of the second core abutment surface 32*b* in the radial direction. The communication groove 32*g* is not formed over the entire region of the third core abutment surface 32*d* in the radial direction, and is partially formed at a portion of the third core abutment surface 32*d* adjacent to the second core abutment surface 32*b*.

The communication groove 32*e* illustrated in FIG. 5 has a shape linearly extending in the radial direction, whereas the communication groove 32*g* according to the present modification has a conical shape. That is, as illustrated in FIG. 16, it is circular as seen from the axis line C direction, and is triangular in cross-sectional view as illustrated in FIG. 15.

As described above, according to the present modification having the communication groove 32*g* of the conical shape, the communication groove 32*g* can be formed only by pressing a tip of a drill blade against the movable core 30, and therefore the communication groove 32*g* can be easily processed.

[Modification B4]

In the embodiment illustrated in FIG. 5, the communication groove 32*e* is formed in the abutment surface of the movable core 30, so that the inside and the outside of the fuel storage chamber B1 communicate with each other. On the other hand, in the present modification illustrated in FIG. 17, by forming the communication hole 20*c* in the needle 20, the inside of the fuel storage chamber B1 and the internal passage 20*a* of the needle 20 communicate with each other.

In a state where the cup 50 abuts against the valve body abutment surface 21*b* at the time of valve closing and in a state where the cup 50 abuts against the second core abutment surface 32*b*, the communication hole 20*c* is located at a position including the first core abutment surface 32*c* in the axis line C direction. Alternatively, the entirety of the communication hole 20*c* is located on the side opposite to the nozzle hole of the first core abutment surface 32*c*. Multiple communication holes 20*c* are formed, and the multiple communication holes 20*c* are located at equal intervals in the circumferential direction when viewed from the moving direction of the needle 20. The communication hole 20*c* has a shape linearly extending in the radial direction of the needle 20.

As described above, according to the present modification in which the communication hole 20*c* is formed in the needle 20, when the movable core 30 moves to the side opposite to the nozzle hole, the fuel stored in the fuel storage chamber B1 flows out to the internal passage 20*a* (outside) of the needle 20 through the communication hole 20*c*. Therefore, the compression of the fuel stored in the fuel storage chamber B1 is restricted, so that the movable core 30 easily moves. Therefore, the reduction of the collision speed of the movable core 30 can be restricted, so that the effect of reducing the magnetic attraction force by the core boost structure can be promoted. Since the movable core 30 easily moves, the variation in the valve opening timing of the needle 20 can be restricted, and consequently, the variation in the fuel injection amount can be restricted.

[Modification B5]

Figure 18:
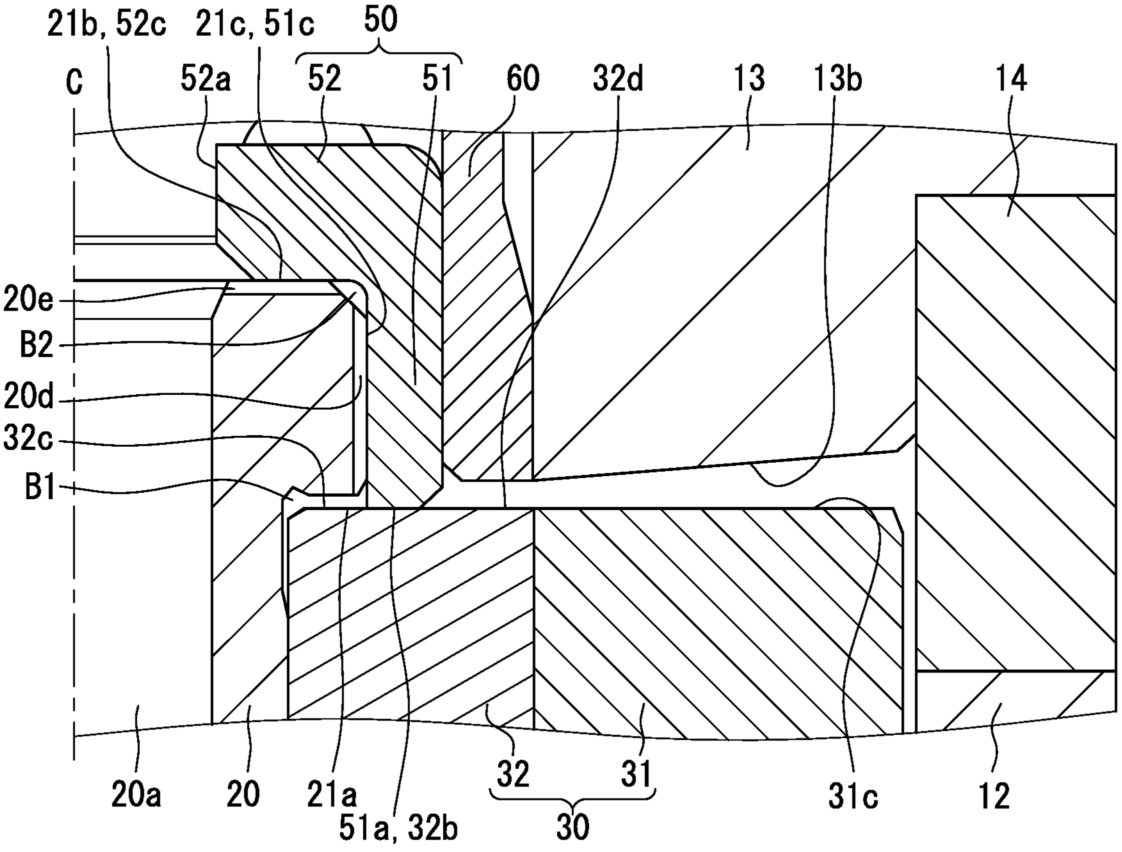
FIG. 18 is a cross-sectional view illustrating a modification B5 with respect to FIG. 5.

In the present modification illustrated in FIG. 18, the sliding surface communication groove 20*d* is formed in the needle 20, so that the inside of the fuel storage chamber B1 and the internal passage 20*a* of the needle 20 communicate with each other. The sliding surface communication groove 20*d* is formed in a valve body-side sliding surface 21*c* of the needle 20 on which the cup 50 slides.

Multiple sliding surface communication grooves 20*d* are formed, and the multiple sliding surface communication grooves 20*d* are located at equal intervals in the circumferential direction when viewed from the moving direction of the needle 20. The sliding surface communication groove 20*d* has a shape linearly extending in the axis line C direction of the needle 20.

As described above, according to the present modification in which the sliding surface communication groove 20*d* is formed in the valve body-side sliding surface 21*c* which is the sliding surface between the needle 20 and the cup 50, when the movable core 30 moves to the side opposite to the nozzle hole, the fuel stored in the fuel storage chamber B1 flows out to the outside through the sliding surface communication groove 20*d*. The outside referred in here is a gap between the valve body abutment surface 21*b* at the time of valve closing and the valve closing force transmission abutment surface 52*c* at the time of valve closing, and the internal passage 20*a*. Therefore, the compression of the fuel stored in the fuel storage chamber B1 is restricted, so that the movable core 30 easily moves. Therefore, the reduction of the collision speed of the movable core 30 can be restricted, so that the effect of reducing the magnetic attraction force by the core boost structure can be promoted. Since the movable core 30 easily moves, the variation in the valve opening timing of the needle 20 can be restricted, and consequently, the variation in the fuel injection amount can be restricted.

[Modification B6]

Figure 19:
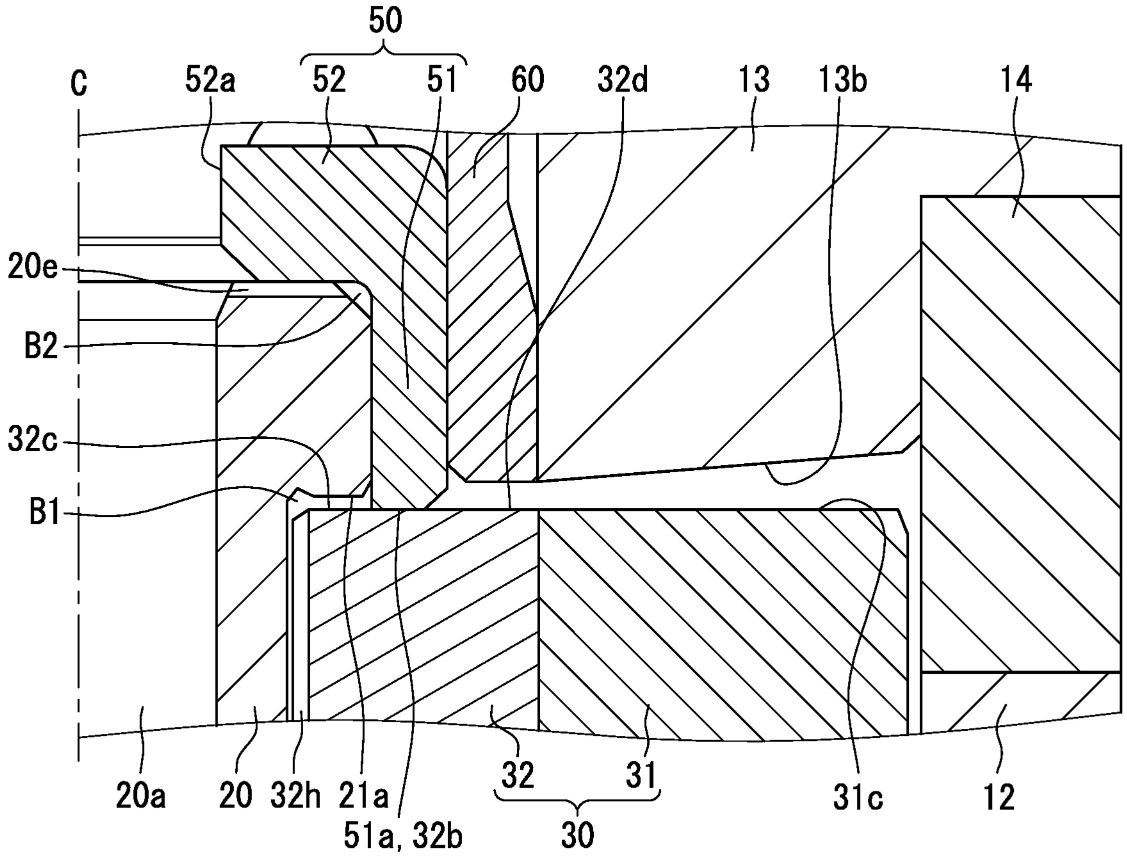
FIG. 19 is a cross-sectional view illustrating a modification example B6 with respect to FIG. 5.

In the present modification illustrated in FIG. 19, a second sliding surface communication groove 32*h* is formed in the inner core 32, so that the inside of the fuel storage chamber B1 and the movable chamber 12*a* communicate with each other. The second sliding surface communication groove 32*h* is formed on the surface of the inner core 32 on which the needle 20 slides, that is, on the inner peripheral surface of the inner core 32.

Multiple second sliding surface communication grooves 32*h* are formed, and the multiple second sliding surface communication grooves 32*h* are located at equal intervals in the circumferential direction when viewed from the moving direction of the movable core 30. The second sliding surface communication groove 32*h* has a shape linearly extending in the axis line C direction of the movable core 30.

As described above, according to the present modification in which the second sliding surface communication groove 32*h* is formed on the sliding surface between the needle 20 and the inner core 32, when the movable core 30 moves to the side opposite to the nozzle hole, the fuel stored in the fuel storage chamber B1 flows out to the movable chamber 12*a* (outside) through the second sliding surface communication groove 32*h*. Therefore, the compression of the fuel stored in the fuel storage chamber B1 is restricted, so that the movable core 30 easily moves. Therefore, the reduction of the collision speed of the movable core 30 can be restricted, so that the effect of reducing the magnetic attraction force by the core boost structure can be promoted. Since the movable core 30 easily moves, the variation in the valve opening timing of the needle 20 can be restricted, and consequently, the variation in the fuel injection amount can be restricted.

<Detailed Description of Configuration Group D>

Figure 20:
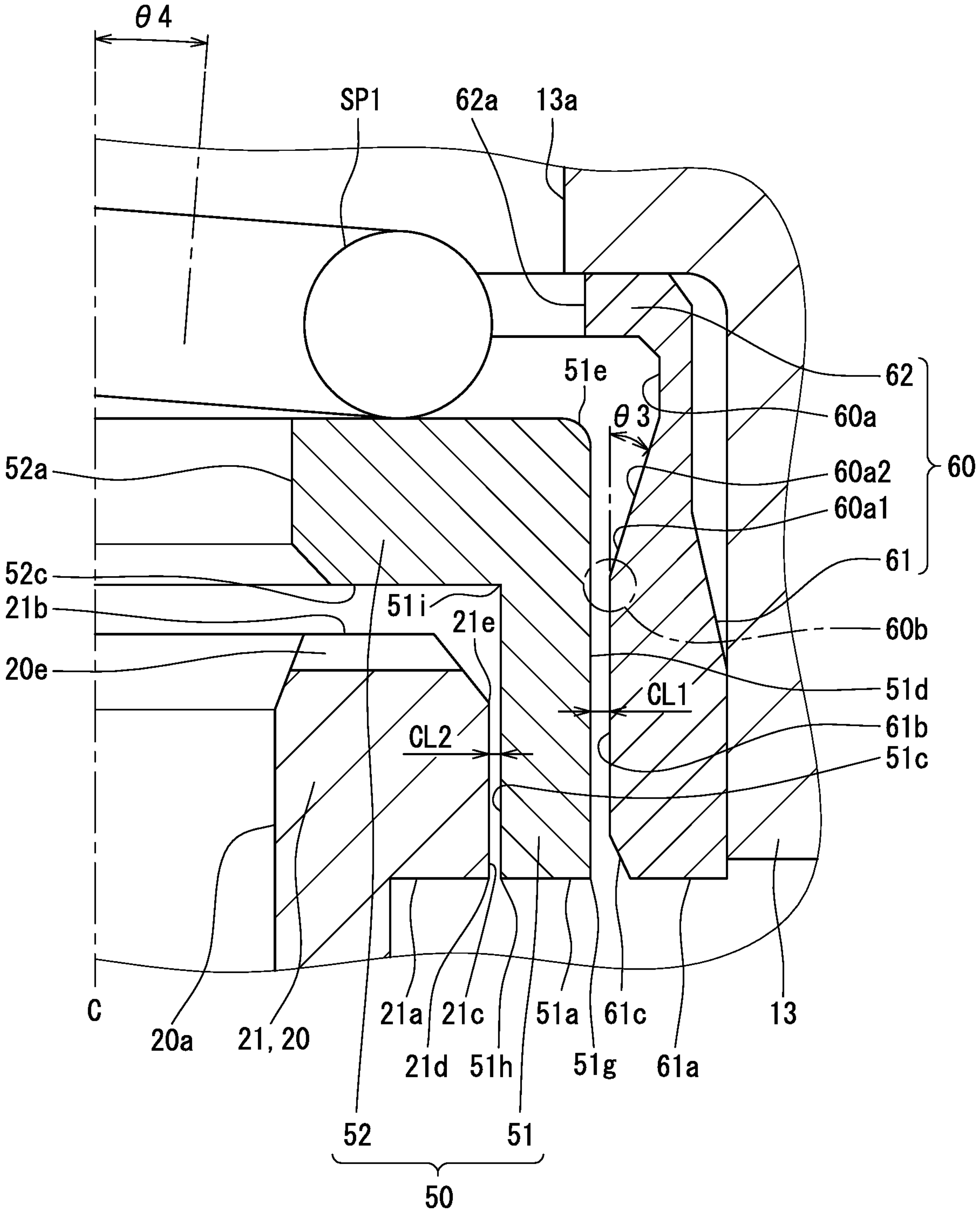
FIG. 20 is a cross-sectional view illustrating a shape of a recess surface formed in the guide member at a time of full lift in the first embodiment.

Next, a configuration group D including at least a recess surface 60*a* and a configuration related to the recess surface 60*a* described below among the configurations included in the fuel injection valve 1 according to the present embodiment will be described in detail with reference to FIGS. 20 and 21.

As described above, the inner peripheral surface of the cylindrical portion 61 of the guide member 60 forms the sliding surface 61*b* that slides with the outer peripheral surface 51*d* of the cylindrical portion 51 of the cup 50. The sliding surface 61*b* slides the outer peripheral surface 51*d* of the cup 50 so as to guide the movement of the cup 50 in the axis line C direction while restricting the movement of the cup 50 in the radial direction. The sliding surface 61*b* is a surface having a shape extending in parallel with the axis line C direction.

The recess surface 60*a* is formed on a surface of the sliding surface 61*b* in the inner surface of the guide member 60, which is connected to the side opposite to the nozzle hole. The recess surface 60*a* is shaped to be recessed in a direction in which the gap with the cup 50 is enlarged in the radial direction. The recess surface 60*a* has a shape extending annularly around the axis line C, and has the same shape in any cross section in the circumferential direction.

An adjacent surface 60*a*1 of the recess surface 60*a* adjacent to the sliding surface 61*b* is a surface connected to the sliding surface 61*b* on the side opposite to the nozzle hole, and has a shape in which a gap CL1 with the cup 50 is gradually enlarged in the radial direction as a distance from the sliding surface 61*b* increases. The adjacent surface 60*a*1 includes a tapered surface 60*a*2 linearly extending when viewed in a cross section including the axis line C. A boundary portion 60*b* of the guide member 60 including a boundary between the adjacent surface 60*a*1 and the sliding surface 61*b* has a shape curved in a direction protruding radially inner side, that is, round. Therefore, abrasion of the cup 50 by the guide member 60 can be restricted.

A chamfered portion 61*c* formed in a tapered shape by chamfering is provided at a portion connecting the stopper abutment end surface 61*a* and the sliding surface 61*b*. The boundary portion including the boundary between the chamfered portion 61*c* and the sliding surface 61*b* has a shape curved in a direction protruding radially inner side, and restricts abrasion of the cup 50 by the guide member 60.

In the cup 50, a corner portion 51*g* connecting the outer peripheral surface 51*d* and the core abutment end surface 51*a*, and a corner portion 51*h* connecting a transmission member-side sliding surface 51*c* and the core abutment end surface 51*a* are chamfered so as to have a tapered shape or round. A corner portion 21*d* of the needle 20, which connects the valve body-side sliding surface 21*c* and the valve body abutment surface 21*a* at the time of valve opening, is also chamfered so as to have a tapered shape or round. A boundary portion 21*e* including a boundary between the chamfered portion of the valve body-side sliding surface 21*c* formed on the side opposite to the nozzle hole and the valve body-side sliding surface 21*c* has a shape curved in a direction protruding radially outer side, and restricts abrasion between the cup 50 and the needle 20.

In the following description, a surface of the surface of the cup 50, which includes the outer peripheral surface 51*d* of the cylindrical portion 51 of the cup 50 and extends in parallel with the axis line C direction, is referred to as a parallel surface. In the example of FIG. 20, the entire outer peripheral surface 51*d* corresponds to the parallel surface, and a range of the surface of the cup 50 indicated by a symbol M1 in FIG. 21 is the parallel surface.

A surface which is connected to the parallel surface on the side opposite to the nozzle hole and which is located radially inner side of the parallel surface is referred to as a connection surface 51*e*. The connection surface 51*e* is curved in a direction protruding radially outer side of the cup 50. A range of the surface of the cup 50 indicated by a symbol M2 in FIG. 21 is the connection surface 51*e*. A surface of the connection surface 51*e* connected to the side opposite to the parallel surface is a spring abutment surface to which the first elastic force is applied by abutting against the first spring member SP1. The spring abutment surface has a shape extending perpendicularly to the axis line C direction.

Figure 21:
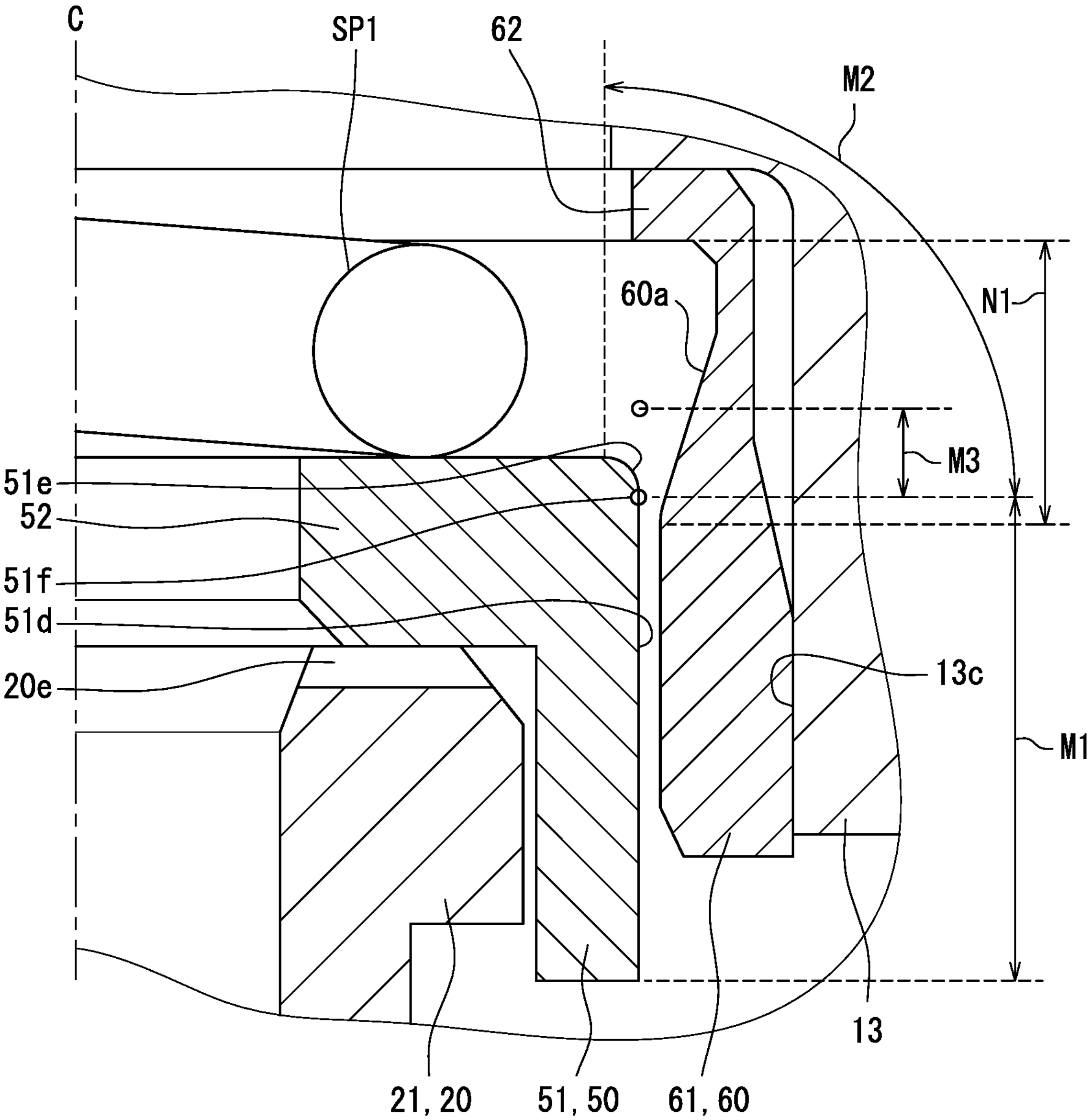
FIG. 21 is a cross-sectional view illustrating a shape of a recess surface formed in the guide member at the time of valve closing in the first embodiment.

A boundary line between the parallel surface and the connection surface 51*e* is referred to as a connection boundary line 51*f* (see a circle in FIG. 21). As the movable core 30 moves in the axis line C direction, the cup 50 also moves in the axis line C direction. An entire range M3 in which the connection boundary line 51*f* moves in the axis line C direction by this movement is included in a range N1 in which the recess surface 60*a* is formed in the axis line C direction.

As described above in the detailed description of the configuration group A, since the gap CL1 for sliding is formed between the cup 50 and the guide member 60, the axis line C of the cup 50 can tilt with respect to the axis line C of the fixed core 13. Since the gap CL2 for sliding is formed between the needle 20 and the cup 50, the axis line C of the needle 20 can further tilt with respect to the axis line C of the cup 50. The tapered surface 60*a*2 is formed so that an inclination angle θ3 (see FIG. 20) at which the tapered surface 60*a*2 tilts with respect to the sliding surface 61*b* of the guide member 60 is larger than the maximum cup tilt angle θ4 of the cup 50.

The gap CL1 between the parallel surface of the cup 50 and the sliding surface 61*b* of the guide member 60 is set larger than the gap CL2 between the cup 50 and the needle 20. Therefore, the cup tilt angle when the gap CL2 is zero is larger than the tilt angle (needle tilt angle) of the needle 20 when the gap CL1 is zero.

The sliding distance between the cup 50 and the guide member 60 in the gap CL1 is set to be longer than the sliding distance between the cup 50 and the needle 20 in the gap CL2. The longer the sliding distance, the smaller the tilt caused by the gap is. For example, the longer the sliding distance in the gap CL1, the smaller the tilt of the cup 50 with respect to the guide member 60 is. The longer the sliding distance in the gap CL2, the smaller the tilt of the needle 20 with respect to the cup 50 is. Even if both tilts are maximum, the connection surface 51*e* is set so as not to hit the guide member 60.

The guide member 60 is formed of a magnetic material, and the cup 50 is formed of a non-magnetic material. In general, the non-magnetic material has a hardness lower than that of the magnetic material. Nevertheless, in the present embodiment, the cup 50 and the guide member 60 have the same hardness. In other words, a high-hardness non-magnetic material is used for the cup 50 instead of a general non-magnetic material. The hardness (cup hardness) of the cup 50 and the hardness (guide member hardness) of the guide member 60 are, for example, values in a range of Vickers hardness HV600 to HV700. If a deviation of the guide member hardness with respect to the cup hardness falls within a range of −10% to +10% of the cup hardness, both hardness are regarded as having the same hardness.

The hardness of the inner core 32 is set lower than the cup hardness. A hard film that is harder than that of the cup 50 may be applied to a portion of the cup 50 that comes into contact with the inner core 32. Alternatively, a hard film that is harder than that of the inner core 32 may be applied to a portion of the inner core 32 that abuts against the cup 50. A specific example of the hard film includes diamond-like carbon (DLC). DLC is an amorphous hard film mainly composed of hydrocarbons or allotropes of carbon. By applying the hard film in this manner, abrasion of the cup 50 or the inner core 32 is restricted. When the hard film is applied to the entire cup 50, it is desirable to prohibit the application of the hard film to a portion of the needle 20 or the guide member 60 that comes into contact with the hard film of the cup 50.

When the abrasion progresses due to the sliding between the cup 50 and the guide member 60, the cup 50 is largely tilted with respect to the guide member 60, and thus the needle 20 is largely tilted together with the cup 50. When the tilt of the needle 20 increases, the valve opening and closing timing of the needle 20 varies, and the variation in the fuel injection amount increases.

To cope with this concern, in the present embodiment, the needle 20 (valve body), the fixed core 13, the movable core 30, the first spring member SP1 (spring member), the cup 50 (valve closing force transmission member), and the guide member 60 are provided.

At a time point when the movable core 30 is attracted by the fixed core 13 and moved by a predetermined amount, the movable core 30 abuts against the needle 20 and causes the needle 20 to perform the valve opening operation. As described above, the first spring member SP1 is elastically deformed with the valve opening operation of the needle 20, and exhibits the valve closing elastic force for causing the needle 20 to perform the valve closing operation. The cup 50 has the valve body transmission portion (disk portion 52) that abuts against the first spring member SP1 and the needle 20 to transmit the valve closing elastic force to the needle 20, and the cylindrical portion 51 that urges the movable core 30 to the nozzle hole side. The guide member 60 has the sliding surface 61*b* that slides the outer peripheral surface 51*d* of the cylindrical portion 51 so as to guide the movement of the cylindrical portion 51 in the axis line C direction while restricting the movement of the cylindrical portion 51 in the radial direction. The guide member 60 is formed with a recess surface 60*a* which is a surface connected to the sliding surface 61*b* on the side opposite to the nozzle hole and which has a recessed shape expanding a gap with the cup 50 is in the radial direction. The valve body transmission portion is a disk-shaped disk portion 52, and the cylindrical portion 51 has a shape extending from the disk outer peripheral end of the disk portion 52 to the nozzle hole side.

Of the surface of the cup 50, a surface, which includes the outer peripheral surface of the cylindrical portion 51 and extends in parallel with the axis line C direction, is a parallel surface, and a surface, which is connected to the parallel surface on the side opposite to the nozzle hole and is located radially inner side of the parallel surface, is a connection surface 51*e*. A boundary line between the parallel surface and the connection surface 51*e* is a connection boundary line 51*f*. The entire range M3 in which the connection boundary line 51*f* moves in the axis line direction is included in the range N1 in which the recess surface 60*a* is formed in the axis line direction. That is, the position of the connection boundary line 51*f* in the axis line direction is in the range N1 in which the recess surface 60*a* is formed regardless of whether the needle 20 is fully lifted or the valve is closed.

Therefore, when the cup 50 moves in the axial direction while sliding on the guide member 60, the connection boundary line 51*f* faces the recess surface 60*a* and does not come into contact with the sliding surface 61*b*. Therefore, the cup 50 can be restricted from being pressed against the guide member 60 in a state where the surface pressure component in the axial direction is large, and the abrasion of the cup 50 can be restricted. Therefore, the tilt of the cup 50 can be restricted, and consequently the tilt of the needle 20 can be restricted, so that the variation in the fuel injection amount due to the variation in the valve opening and closing timing of the needle 20 can be restricted.

In the fuel injection valve 1 according to the present embodiment, the adjacent surface 60*a*1 which is adjacent to the sliding surface 61*b* of the recess surface 60*a* has a shape in which the gap CL1 is gradually enlarged with the cup 50 in the radial direction as the distance from the sliding surface 61*b* increases. Contrary to the present embodiment, in a case where the adjacent surface 60*a*1 has a shape enlarged in a stepped manner in the radial direction is, the surface pressure is increased when a corner portion of the stepped portion is pressed against the cup 50 moving to the nozzle hole side, and there is a concern that the abrasion is promoted. In view of this point, since the adjacent surface 60*a*1 according to the present embodiment has a shape gradually expanding in the radial direction, the above-mentioned surface pressure can be alleviated, and the concern of promoting the abrasion between the cup 50 and the guide member 60 can be reduced.

In the fuel injection valve 1 according to the present embodiment, the adjacent surface 60*a*1 includes a tapered surface 60*a*2 linearly extending in a cross-sectional view. The inclination angle θ3 at which the tapered surface 60*a*2 tilts with respect to the sliding surface 61*b* is larger than the maximum tilt angle θ4 assumed among the angles at which the cup 50 is tilted. Therefore, the possibility that the tilting cup 50 comes into contact with the tapered surface 60*a*2 can be reduced, and the concern of promoting the abrasion between the cup 50 and the guide member 60 can be reduced.

In the fuel injection valve 1 according to the present embodiment, the boundary portion 60*b* including the boundary between the adjacent surface 60*a*1 and the sliding surface 61*b* has a curved shape in a direction protruding radially inner side. Contrary to the present embodiment, in a case where the boundary portion has a sharp shape, the surface pressure when the boundary portion is pressed against the cup 50 moving to the nozzle hole side is increased, and there is a concern of promoting abrasion. In view of this point, in the present embodiment, since the boundary portion 60*b* has a shape curved in a direction protruding radially inner side, the surface pressure can be alleviated, and the concern of promoting abrasion can be reduced.

In the fuel injection valve 1 according to the present embodiment, the guide member 60 is formed of the magnetic material, and the cup 50 is formed of the non-magnetic material. According to this, it is possible to prevent the parallel surface of the cup 50 from being pressed against the sliding surface 61*b* of the guide member 60 by the electromagnetic attraction force acting on the cup 50 in the radial direction. Therefore, the abrasion between the cup 50 and the guide member 60 can be restricted.

In the fuel injection valve 1 according to the present embodiment, the cup 50 and the guide member 60 have the same hardness. In general, the non-magnetic material has a hardness lower than that of the magnetic material. Nevertheless, in the present embodiment, as described above, a high-hardness non-magnetic material is used for the cup 50 instead of a general non-magnetic material. Therefore, it is possible to avoid the concern that the abrasion of the member on the low hardness side is promoted when there is a difference in hardness, while avoiding the electromagnetic attraction force acting on the cup 50.

In the fuel injection valve 1 according to the present embodiment, the gap CL1 between the parallel surface of the cup 50 and the sliding surface 61*b* of the guide member 60 is larger than the gap CL2 between the cup 50 and the needle 20.

The needle 20 may be opened and closed in a state of tilting with respect to the axis line C direction. When the needle 20 tilts, the cup 50 is tilted by the tilting force, and when the cup 50 is tilted, the force with which the cup 50 is pressed against the guide member 60 increases, which may cause abrasion. Therefore, according to the present embodiment in which the recess surface 60*a* is applied to the configuration in which abrasion is concerned as described above, it can be said that the abrasion restricting effect by the recess surface 60*a* is more effectively exhibited.

<Detailed Description of Configuration Group E>

Next, a configuration group E including at least a press-fit structure between the outer core 31 and the inner core 32 and a configuration related to the press-fit structure among the configurations of the fuel injection valve 1 according to the present embodiment will be described in detail with reference to FIGS. 22 and 23. A modification of the configuration group E will be described later with reference to FIGS. 24 to 26.

Figure 22:
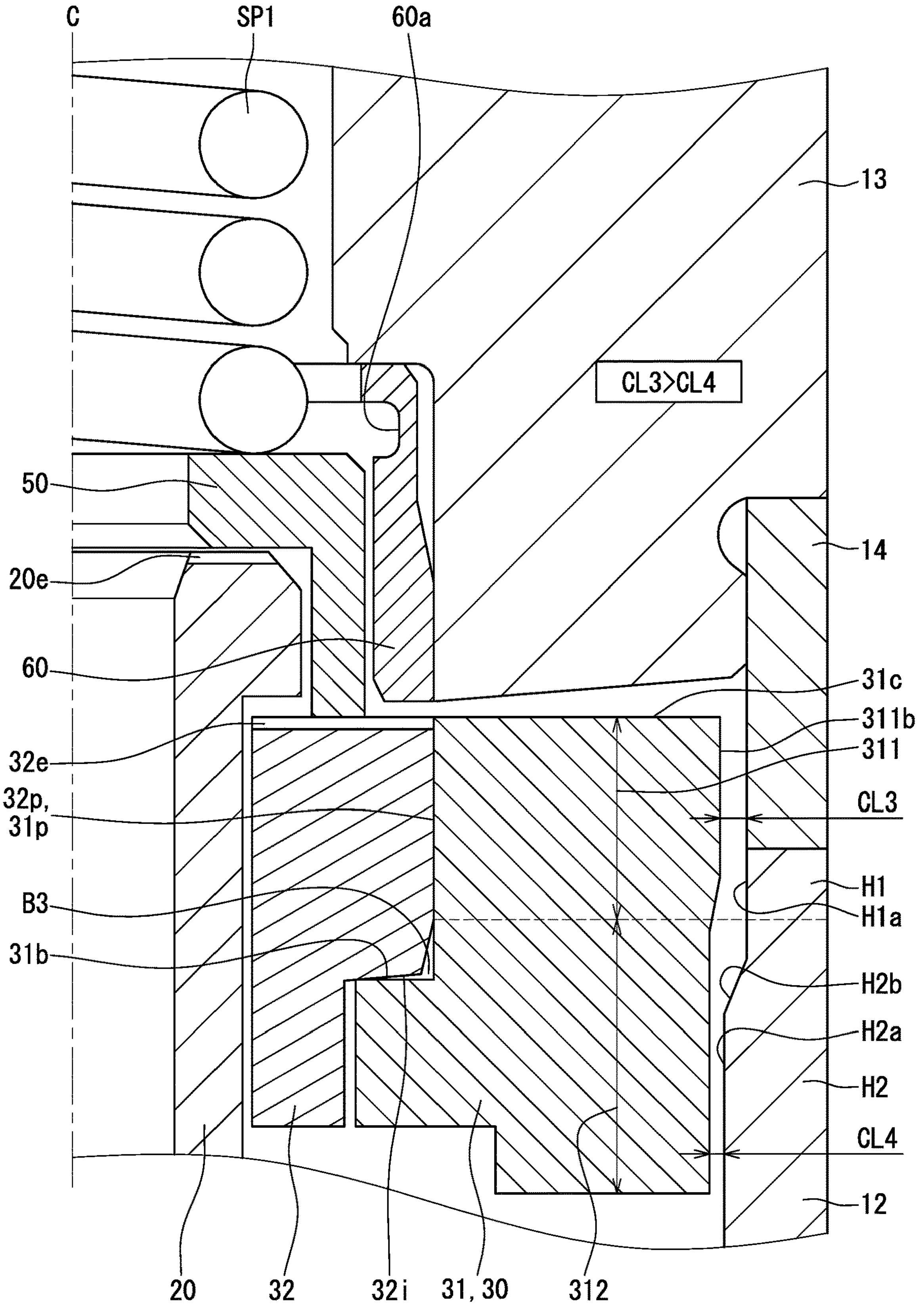
FIG. 22 is a cross-sectional view illustrating a gap between the movable core and a holder at the time of valve closing in the first embodiment.

As illustrated in FIG. 22, a press-fit surface 31*p* formed on the inner peripheral surface of the outer core 31 and a press-fit surface 32*p* formed on the outer peripheral surface of the inner core 32 are press-fitted and fixed to each other. These press-fit surfaces 31*p* and 32*p* are not formed over the entire region in the axis line C direction, but are formed partially in the axis line C direction.

In the present embodiment, the press-fit surfaces 31*p* and 32*p* are formed on a part of the movable core 30 on the side opposite to the nozzle hole. In the following description, a portion of the outer core 31 where the press-fit surface 31*p* is formed, which is an entire portion including the press-fit surface 31*p* in the axis line C direction, is referred to as a press-fit region 311. A portion of the outer core 31 where the press-fit surface 31*p* is not formed, which is an entire portion not including the press-fit surface 31*p* in the radial direction is referred to as a non-press-fit region 312. That is, the outer core 31 is divided, in the axis line C direction, into the press-fit region 311 on the side opposite to the nozzle hole and the non-press-fit region 312 on the nozzle hole side adjacent to the press-fit region in the axis line C direction.

The non-press-fit region 312 is formed with a locking portion 31*b* that abuts against a locking portion 32*i* of the inner core 32 in the axis line C direction. The locking portion 32*i* prevents the inner core 32 from shifting to the nozzle hole side with respect to the outer core 31 due to the collision of the inner core 32 with the guide member 60 or the like. In the inner peripheral surface of the non-press-fit region 312, a gap B3 with the inner core 32 is formed at a portion through from the locking portion 31*b* to the boundary with the press-fit region 311. In other words, the gap B3 is located at the boundary between the press-fit region 311 and the non-press-fit region 312.

The gap B3 functions as a region for confining burr generated when the inner core 32 is press-fitted into the outer core 31. Since the material of the outer core 31 is softer than that of the inner core 32, the burr is generated on the press-fit surface 31*p* of the outer core 31. Specifically, the above-mentioned burr is generated when the nozzle hole-side end portion of the press-fit surface 32*p* of the inner core 32 scrapes off a part of the press-fit surface 31*p* of the outer core 31.

In the present embodiment, after the inner core 32 is assembled to the outer core 31, the communication groove 32*e* and the outer communication groove 31*e* are formed by cutting or the like, and then the first core abutment surface 32*c* and the second core abutment surface 32*b* are ground. Therefore, the positions of the first core abutment surface 32*c* and the second core abutment surface 32*b* in the axis line C are aligned.

Figure 23:
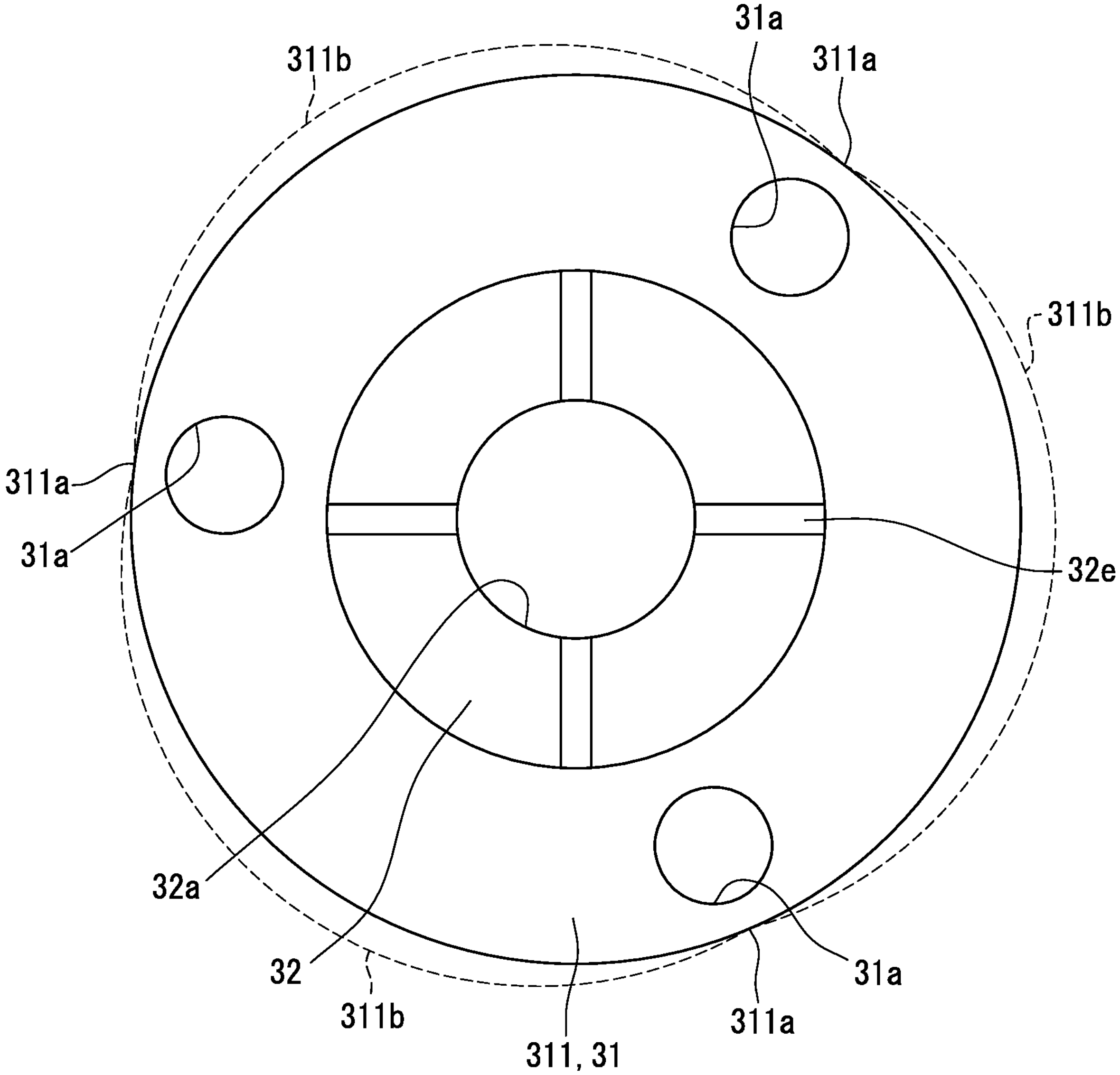
FIG. 23 is a top view of a needle illustrated in FIG. 22 as seen from the side opposite to the nozzle hole.

The outer peripheral surface of the outer core 31 illustrated by a solid line in FIG. 23 illustrates a state before the press-fit with the inner core 32, and is circular (perfect circle) in a top view. On the other hand, in a state after the press-fit with the inner core 32, the outer peripheral surface of the press-fit region 311 of the outer core 31 bulges radially outer side as illustrated by a dotted line in FIG. 23. However, a portion (small expansion portion 311*a*) where the through-hole 31*a* exists is less likely to bulge than a portion (large expansion portion 311*b*) where the through-hole 31*a* does not exist. Therefore, the outer peripheral surface of the press-fit region 311 after the press-fit deformation is not a perfect circle, and the large expansion portion 311*b* has a shape with a diameter larger than that of the small expansion portion 311*a*. In a state before the press-fit, the diameter of the outer peripheral surface of the press-fit region 311 is the same as that of the non-press-fit region 312. Therefore, in a state after the press-fit, the outer peripheral surface of the press-fit region 311 has a diameter larger than that of the outer peripheral surface of the non-press-fit region 312 (see FIG. 22).

The holder for accommodating the movable core 30 in a movable state has the main body 12 which is a magnetic member having magnetism, and the non-magnetic member 14 adjacent to the main body 12 in the moving direction. The end surface of the main body 12 and the end surface of the non-magnetic member 14 are welded to each other. A portion of the holder facing the outer peripheral surface of the press-fit region 311 is referred to as a press-fit facing portion H1, and a portion of the holder facing the outer peripheral surface of the non-press-fit region 312 is referred to as a non-press-fit facing portion H2. Of the gap in the radial direction between the inner peripheral surface of the press-fit facing portion H1 and the outer peripheral surface of the press-fit region 311, a minimum gap is referred to as a press-fit portion gap CL3. Of the gap in the radial direction between the inner peripheral surface of the non-press-fit facing portion H2 and the outer peripheral surface of the non-press-fit region 312, a minimum gap is referred to as a non-press-fit portion gap CL4. A minimum inner diameter of the press-fit facing portion H1 is formed larger than a minimum inner diameter of the non-press-fit facing portion H2 so that the press-fit portion gap CL3 is larger than the non-press-fit portion gap CL4.

The inner peripheral surface of the press-fit facing portion H1 has a shape extending in parallel with the moving direction (direction of axis line C) of the movable core 30. The inner peripheral surface of the non-press-fit facing portion H2 has a parallel surface H2*a* extending in parallel with the moving direction, and a connection surface H2*b* connecting the inner peripheral surface of the press-fit facing portion H1 and the parallel surface H2*a*. The connection surface H2*b* has a shape of which an inner diameter gradually decreases as approaching the parallel surface H2*a*. Although a part of the main body 12 is included in the non-press-fit facing portion H2, the non-magnetic member 14 is not included therein, and the parallel surface H2*a* and the connection surface H2*b* are formed by the main body 12. In other words, the main body 12 has a shape having the parallel surface H2*a* and the connection surface H2*b* having different inner diameter dimensions from each other. The non-press-fit portion gap CL4, which is the minimum gap between the non-press-fit facing portion H2 and the non-press-fit region 312, corresponds to a gap in the parallel surface H2*a* formed by the main body 12.

More specifically, a flow channel cross-sectional area formed by the press-fit portion gap CL3 is larger than a flow channel cross-sectional area formed by the non-press-fit portion gap CL4. These flow channel cross-sectional areas are areas of the cross section perpendicular to the axis line C direction, in the flow channels formed by the press-fit portion gaps CL3 and CL4.

The inner peripheral surface H1*a* of the press-fit facing portion H1 has a shape extending in parallel with the moving direction. The press-fit facing portion H1 includes a part of the non-magnetic member 14 and a part of the main body 12. The non-magnetic member 14 is formed to have a uniform inner diameter dimension over the entire axis line C direction. The press-fit portion gap CL3, which is the minimum gap between the press-fit facing portion H1 and the press-fit region 311, corresponds a gap at a portion of the connection surface H2*b* of the main body 12 on the side opposite to the nozzle hole, or in the non-magnetic member 14.

In a case where the movable core 30 attracted to the fixed core 13 is configured by press-fitting the inner core 32 for collision with the guide member 60 or the like and the outer core 31 for the magnetic circuit, the outer diameter of the outer core 31 is slightly expanded by the press-fit. As a result, the gap between the inner peripheral surface of the holder accommodating the movable core 30 and the outer peripheral surface of the outer core 31 is small, and the flow resistance received by the movable core 30 from the fuel existing in the gap increases. Since it is difficult to manage an amount of swelling of the outer diameter by the press-fit, there is a machine difference variation in the magnitude of the flow resistance, thereby resulting in a variation in the travel speed of the movable core 30. As a result, the machine difference variation is generated in the valve opening responsiveness, thereby resulting in a large variation in the injection amount.

To cope with this problem, the fuel injection valve 1 according to the present embodiment includes the needle 20 (valve body), the fixed core 13, the movable core 30, the main body 12 (holder), the non-magnetic member 14 (holder), and the guide member 60 (stopper member). The movable core 30 has a cylindrical shape, and moves together with the needle 20 by magnetic attraction force to open the nozzle hole 11*a*. The holder has a movable chamber 12*a* filled with the fuel, and accommodates the movable core 30 in the movable chamber 12*a* in a movable state. The guide member 60 abuts against the movable core 30 and restricts the movable core 30 from the direction moving away from the nozzle hole 11*a*. The movable core 30 has the inner core 32 abutting against the guide member 60, and the outer core 31 press-fitted and fixed to the outer peripheral surface of the inner core 32. The outer core 31 has the press-fit region 311 which is press-fitted and fixed to the outer peripheral surface of the inner core 32 in the moving direction of the movable core 30, and the non-press-fit region 312 which is not press-fitted to the outer peripheral surface of the inner core 32 and is adjacent to the press-fit region 311 in the moving direction. Among the gaps between the inner peripheral surface of the holder and the outer peripheral surface of the movable core 30, the smallest gap CL3 in the press-fit region 311 is larger than the smallest gap CL4 in the non-press-fit region 312.

The flow resistance received by the movable core 30 from the fuel existing in the gap between the outer peripheral surface of the outer core and the inner peripheral surface of the holder is greatly influenced by the smallest gap in a case where the size of the gap changes in accordance with the axial position. Among the gaps between the inner peripheral surface of the holder and the outer peripheral surface of the movable core, the gap CL3 in the press-fit region 311 has a larger machine difference variation than that in the gap CL4 in the non-press-fit region 312. Therefore, contrary to the present embodiment, in a case where the minimum gap CL3 in the press-fit region 311 is smaller than the minimum gap CL4 in the non-press-fit region 312, the flow resistance is greatly affected by the gap CL3 in the press-fit region 311. Therefore, a large machine difference variation is generated in the flow resistance. In contrast, according to the present embodiment, the minimum gap CL3 in the press-fit region 311 is larger than the minimum gap CL4 in the non-press-fit region 312. Therefore, the influence for the flow resistance on the gap CL3 in the press-fit region 311 can be restricted, and the variation in the travel speed of the movable core 30 can be restricted. As a result, the machine difference variation of the valve opening responsiveness can be restricted, and consequently, the variation in the injection amount can be reduced.

In the fuel injection valve 1 according to the present embodiment, the inner peripheral surface H1*a* of the press-fit facing portion H1 has a shape extending in parallel with the moving direction. The inner peripheral surface of the non-press-fit facing portion H2 has the parallel surface H2*a* extending in parallel with the moving direction, and the connection surface H2*b* connecting the inner peripheral surface of the press-fit facing portion H1 and the parallel surface H2*a*. The connection surface H2*b* has a shape of which an inner diameter gradually decreases as approaching the parallel surface H2*a*.

A boundary between a portion (large expansion portion 311*b*) in which swelling is largely generated by the press-fit and a portion (small expansion portion 311*a*) in which swelling has a shape that gradually swells. In view of this, according to the present embodiment having the connection surface H2*b* of which the inner diameter gradually decreases, the gap of the magnetic circuit formed by the portion of the connection surface H2*b* can be made as small as possible. As illustrated in FIG. 22, the connection surface H2*b* may have a tapered shape of which an inner diameter changes linearly and gradually, a curved shape of which an inner diameter changes in a curved manner, or a step shape of which an inner diameter changes in a stepped manner.

In the fuel injection valve 1 according to the present embodiment, the holder has the main body 12 (magnetic member) having magnetism, and the non-magnetic member 14 adjacent to the main body 12 in the moving direction, and the end surface of the main body 12 and the end surface of the non-magnetic member 14 are welded to each other. This makes it possible to carry out a process of making the inner diameter of the holder large or small and a process of removing a weld mark from the inner peripheral surface of the holder in a series of operations, thereby reducing the labor required for the process of making the inner diameter of the holder large or small.

In the fuel injection valve 1 according to the present embodiment, three or more through-holes 31*a* penetrating in the moving direction are formed in the outer core 31 at equal intervals in the circumferential direction. According to this, there are three or more locations, where the flow resistance received by the movable core 30 from the fuel in the movable chamber 12*a* is low, at equal intervals in the axis line direction. Therefore, when the movable core 30 moves in the axis line C direction, a change in the tilt direction of the movable core 30 with respect to the axis line C direction can be restricted. Therefore, since the behavior of the movable core 30 can be restricted from becoming unstable, the variation in the valve opening responsiveness can be further restricted.

[Modification E1]

Figure 24:
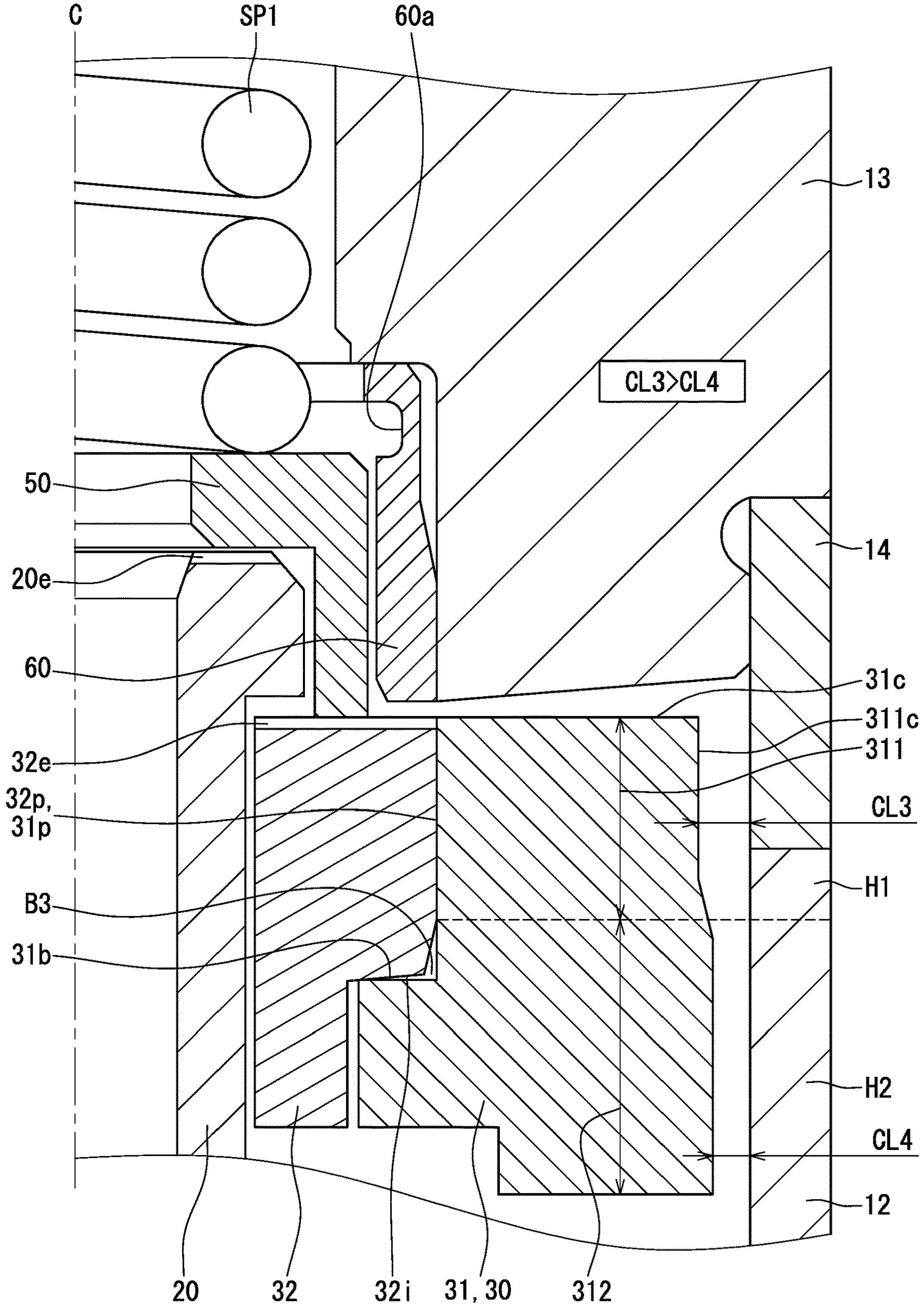
FIG. 24 is a cross-sectional view illustrating a modification E1 with respect to FIG. 22.

In the present modification illustrated in FIG. 24, the maximum outer diameter of the outer core 31 in the press-fit region 311 is smaller than the maximum outer diameter of the outer core 31 in the non-press-fit region 312.

Specifically, in state before press-fit, the outer diameter of the press-fit region 311 is formed sufficiently smaller than the outer diameter of the non-press-fit region 312, and the outer diameter of the press-fit region 311 is formed smaller than the outer diameter of the non-press-fit region 312 even when the press-fit region 311 is swelled by the press-fit. In short, in the state before press-fit, the outer peripheral surface of the press-fit region 311 is cut to form a recess portion 311*c*, and a cutting depth of the recess portion 311*c* is set sufficiently large so that the recess portion 311*c* remains even after being swelled by the press-fit. The inner diameter dimension of the non-press-fit facing portion H2 is the same in the axis line C direction similar to the press-fit facing portion H1.

As described above, since the outer peripheral surface of the press-fit region 311 is formed smaller than the non-press-fit region 312 and the inner peripheral surface of the non-press-fit facing portion H2 is formed to be the same as the press-fit facing portion H1, the press-fit portion gap CL3 is larger than the non-press-fit portion gap CL4. Therefore, the same effects as those of the fuel injection valve 1 illustrated in FIG. 23 are exhibited in the present modification.

[Modification E2]

Figure 25:
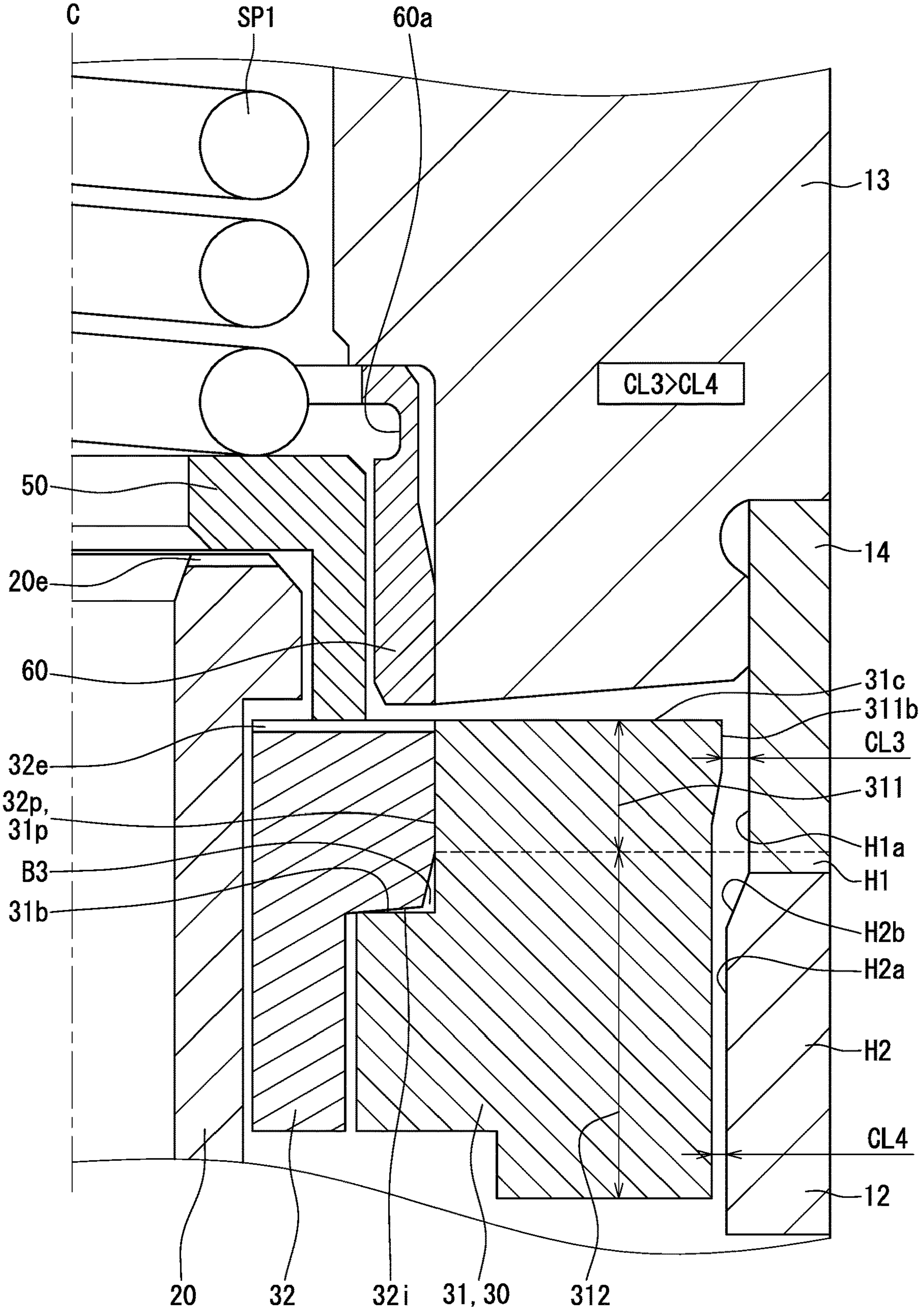
FIG. 25 is a cross-sectional view illustrating a modification E2 with respect to FIG. 22.

In the present modification illustrated in FIG. 25, all of the press-fit facing portion H1 of the holder is formed of the non-magnetic member 14, and the main body 12 is not included in the press-fit facing portion H1. For example, by shortening a length of the press-fit surfaces 31*p* and 32*p* in the axis line C direction as compared with the structure of FIG. 23, the entire press-fit facing portion H1 is formed by the non-magnetic member 14. Alternatively, the length of the non-magnetic member 14 in the axis line C direction is made longer than that of the structure of FIG. 23, so that the entire press-fit facing portion H1 is formed of the non-magnetic member 14. Also in the present modification, since the press-fit portion gap CL3 is formed larger than the non-press-fit portion gap CL4, the same effects as those of the fuel injection valve 1 illustrated in FIG. 23 are exhibited.

[Modification E3]

Figure 26:
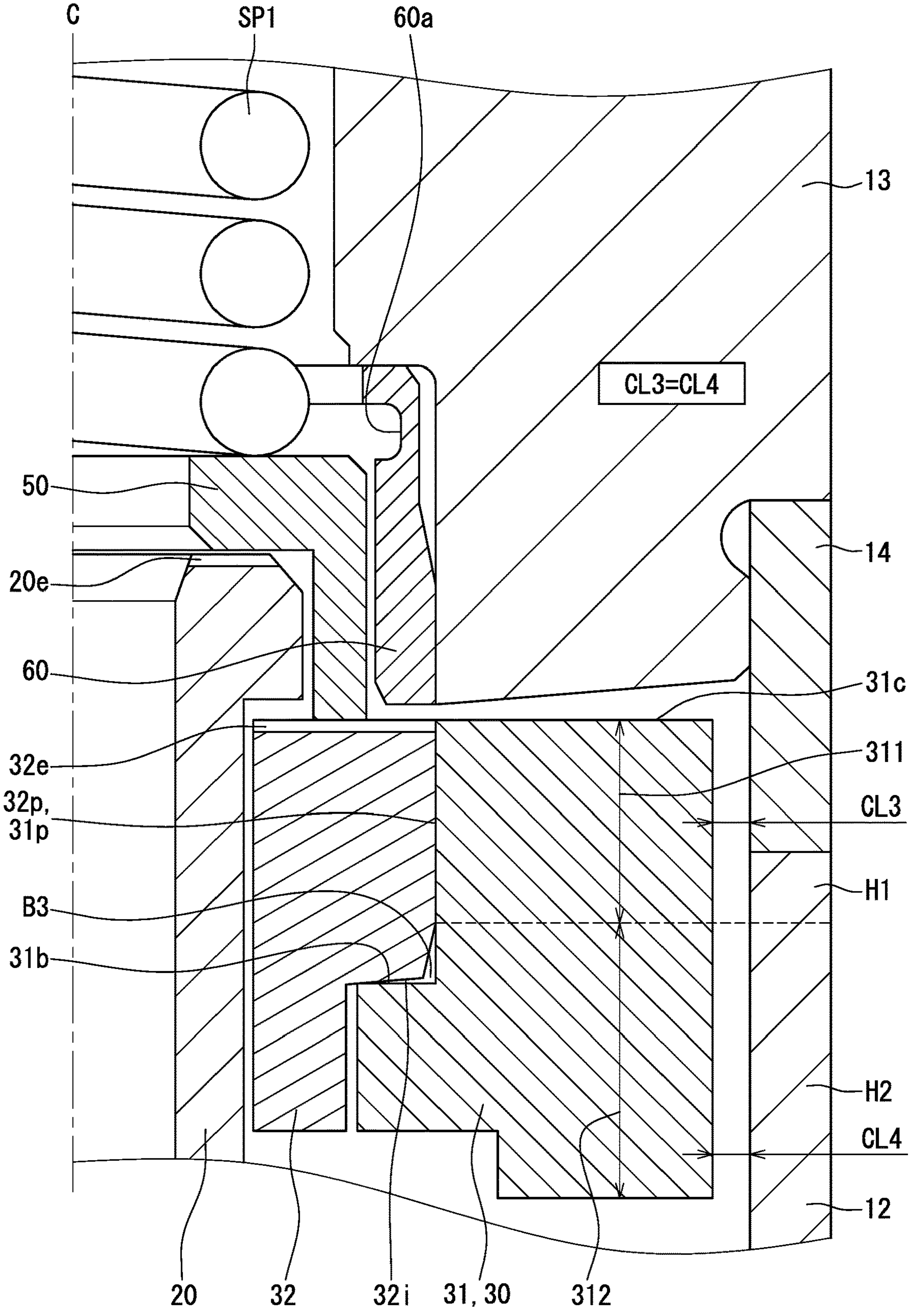
FIG. 26 is a cross-sectional view illustrating a modification E3 with respect to FIG. 22.

In the present modification example illustrated in FIG. 26, a portion of the press-fit region 311 which is swelled in the radial direction by the press-fit is removed, and the maximum outer diameter of the outer core 31 in the press-fit region 311 is formed to be the same as the maximum outer diameter of the outer core 31 in the non-press-fit region 312.

Specifically, in a state before the press-fit with the inner core 32, the outer core 31 of which the outer peripheral surface is circular (perfect circle) in a top view is prepared (preparation process) and is press-fitted with the inner core 32 (press-fitting process). After that, the large expansion portion 311*b* (see FIG. 23) swelled by the press-fit is cut (cutting process) after the press-fit, whereby the outer core 31 is formed so that the outer peripheral surface thereof is circular (perfect circle) in a top view. The inner diameter dimensions of the press-fit facing portion H1 and the non-press-fit facing portion H2 are the same in the axis line C direction. Therefore, the press-fit portion gap CL3 and the non-press-fit portion gap CL4 are the same. Therefore, the same effects as those of FIG. 23 are exhibited by the present modification.

Second Embodiment

Figure 27:
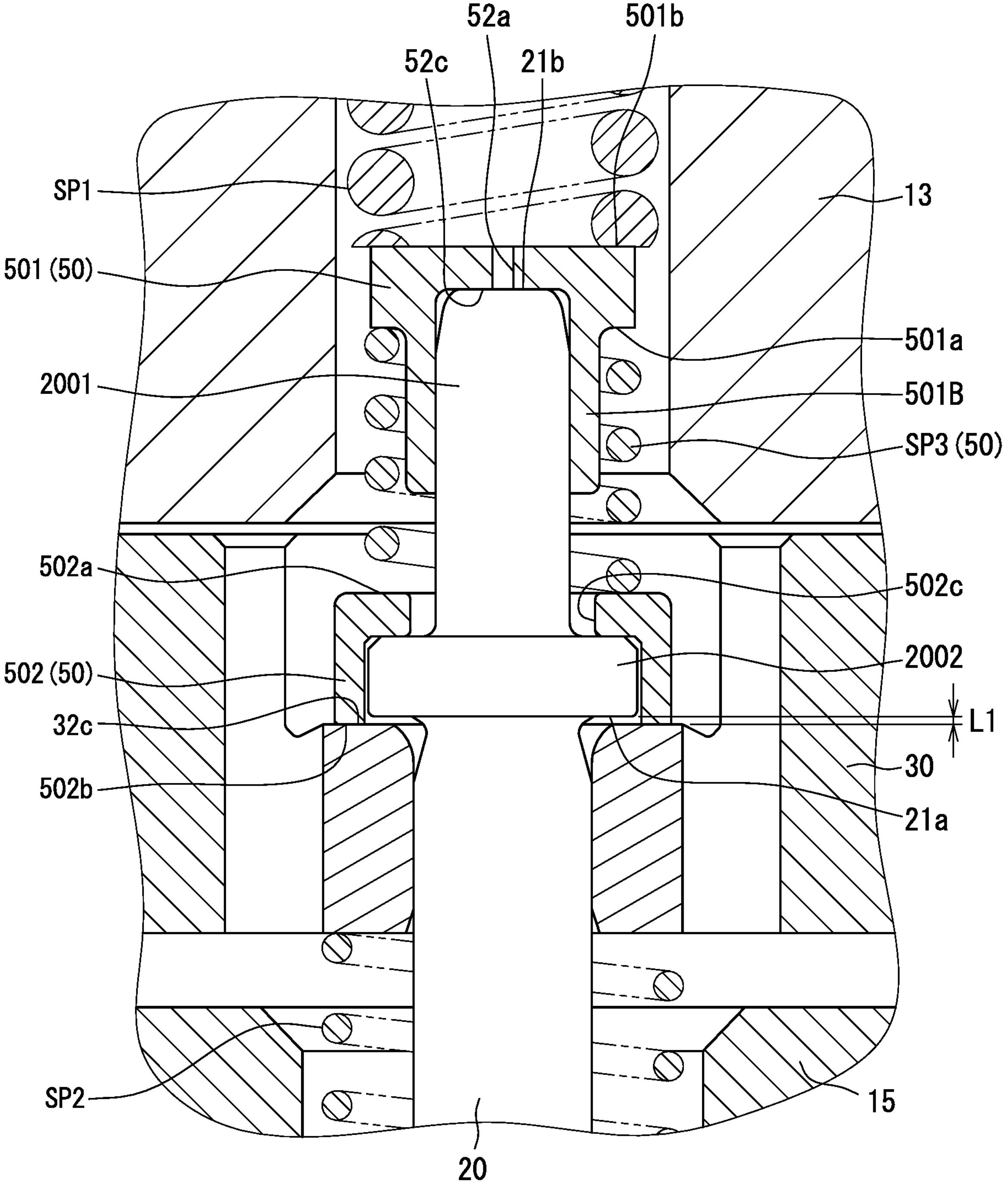
FIG. 27 is a cross-sectional view of a fuel injection valve illustrating a second embodiment.

While the valve closing force transmission member according to the first embodiment is provided by the cup 50, the valve closing force transmission member according to the present embodiment is provided by a first cup 501, a second cup 502, and a third spring member SP3 (see FIG. 27) described below. Except for the configuration described below, the configuration of the fuel injection valve according to the present embodiment is the same as the configuration of the fuel injection valve according to the first embodiment.

The first cup 501 abuts against the first spring member SP1 and the needle 20, and transmits the valve closing elastic force by the first spring member SP1 to the needle 20. In short, the first cup 501 exhibits the same function as the disk portion 52 of the cup 50 according to the first embodiment. The first cup 501 is formed with a through-hole 52*a* similar to that of the first embodiment.

The third spring member SP3 is an elastic member that is elastically deformed in the axis line direction to exert an elastic force. One end of the third spring member SP3 abuts against the abutment surface 501*a* of the first cup 501, and the other end of the third spring member SP3 abuts against an abutment surface 502*a* of the second cup 502. Therefore, the third spring member SP3 is sandwiched between the first cup 501 and the second cup 502, elastically deforms in the axial direction, and exerts an elastic force due to the elastic deformation.

The second cup 502 abuts against the movable core 30 during the valve closing operation to urge the movable core 30 to the nozzle hole side. In short, the second cup 502 exhibits the same function as that of the cylindrical portion 51 of the cup 50 according to the first embodiment. The third spring member SP3 exhibits a function of transmitting a force in the axial direction between the first cup 501 and the second cup 502.

The needle 20 has a main body portion 2001 and an enlarged diameter portion 2002. A valve body abutment surface 21*b* at the time of valve closing is formed at an end portion of the main body portion 2001 on the side opposite to the nozzle hole. The valve body abutment surface 21*b* at the time of valve closing abuts against the valve closing force transmission abutment surface 52*c* of the valve closing force transmission member (first cup 501) in the same manner as in the first embodiment.

The enlarged diameter portion 2002 is located closer to the nozzle hole side than the valve body abutment surface 21*b* at the time of valve closing, and has a disk shape where a diameter of the main body portion 2001 is enlarged. A valve body abutment surface 21*a* at the time of valve opening is formed on a surface of the enlarged diameter portion 2002 on of the nozzle hole side. The valve body abutment surface 21*a* at the time of valve opening abuts against the first core abutment surface 32*c* of the movable core 30 in the same manner as in the first embodiment. In the valve closed state, a length of the gap in the axis line C direction between the valve body abutment surface 21*a* and the first core abutment surface 32*c* at the time of valve opening corresponds to the gap amount L1 according to the first embodiment.

In a state immediately after the energization of the coil 17 is switched from OFF to ON, the magnetic attraction force acts on the movable core 30 to initiate the movement of the movable core 30 toward the valve opening side. When the movable core 30 moves while pushing up the second cup 502 and an amount of movement thereof reaches the gap amount L1, the first core abutment surface 32*c* of the movable core 30 collides with the valve body abutment surface 21*a* of the needle 20 at the time of valve opening.

In the present embodiment, the guide member 60 is eliminated, and the movable core 30 abuts against the fixed core 13, thereby regulating a movement of the valve opening operation of the needle 20. When the movable core 30 collides with the needle 20 as described above, a gap is formed between the fixed core 13 and the movable core 30, and a length of the gap in the axis line C direction corresponds to the lift amount L2 of the first embodiment.

The elastic force of the first spring member SP1 also acts on the needle 20 in a period up to the collision time point. After the collision, the movable core 30 continues to move further by the magnetic attraction force, and when the amount of the movement after the collision reaches the lift amount L2, the movable core 30 collides with the fixed core 13 and stops moving. A separation distance between the body-side seat 11*s* and the valve body-side seat 20*s* in the axis line C direction at the time of the stop of this movement corresponds to a full lift amount of the needle 20, and coincides with the lift amount L2 described above.

Third Embodiment

Figure 28:
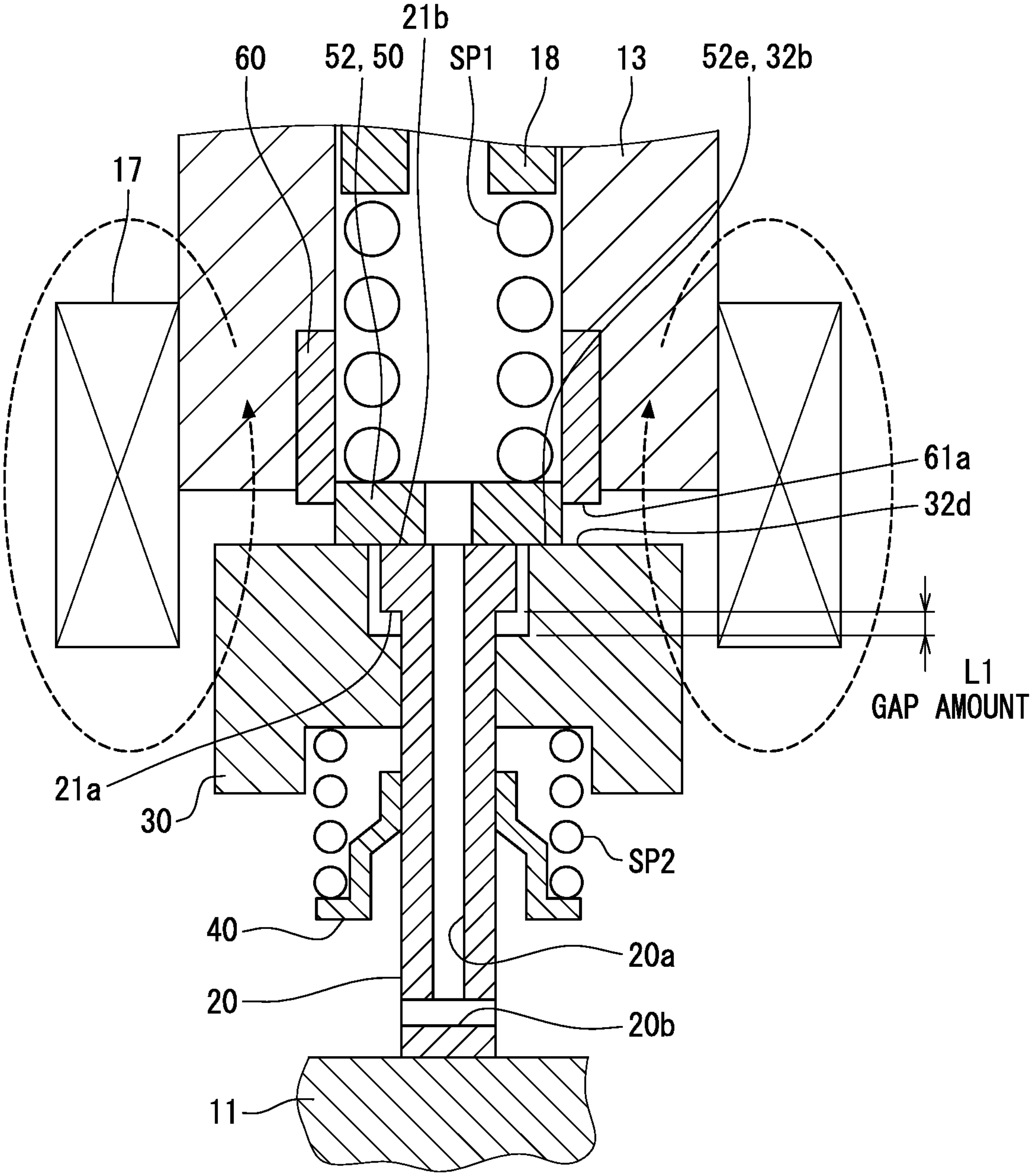
FIG. 28 is a cross-sectional view of a fuel injection valve illustrating a third embodiment.

The valve closing force transmission member (cup 50) according to the first embodiment has a cup shape having the cylindrical portion 51 and the disk portion 52. On the other hand, the valve closing force transmission member according to the present embodiment has a disk shape configured of the disk portion 52, and the cylindrical portion 51 is eliminated (see FIG. 28). Except for the configuration described below, the configuration of the fuel injection valve according to the present embodiment is the same as the configuration of the fuel injection valve according to the first embodiment.

In the first embodiment, a surface (core abutment end surface 51*a*) of the valve closing force transmission member, against which the abutment surface (second core abutment surface 32*b*) of the movable core 30 abuts, is formed in the cylindrical portion 51. On the other hand, in the present embodiment, a surface of the disk portion 52 on the nozzle hole side functions as a core abutment end surface 52*e* that abuts against the movable core 30 (see FIG. 28).

Other Embodiments

The disclosure in the present specification is not limited to the combinations of components and/or elements illustrated in the embodiments. The disclosure may have additional portions that may be added to the embodiments. The disclosure encompasses omission of components and/or elements of the embodiments. The disclosure encompasses a replacement or a combination of components and/or elements between one embodiment and another. For example, the fuel injection valve 1 according to the first embodiment includes all of the configuration groups A, B, D, and E, but may include any combination of the configuration groups.

In the example illustrated in FIG. 5, the taper angle θ1 of the movable core facing surface 31*c* is set larger than the maximum angle at which the movable core 30 can tilt, that is, the maximum core tilt angle θ2. On the other hand, the taper angle θ1 may be set smaller than the maximum core tilt angle θ2, or may be set to the same size as the maximum core tilt angle θ2.

In the example illustrated in FIG. 5, the attracting surface is formed in the tapered shape, and the attracted surface is formed in the flat shape in parallel to the perpendicular line D. On the other hand, the attracted surface may be formed in the tapered shape, and the attracting surface may be formed in the flat shape in parallel to the perpendicular line D.

In the first embodiment, the separation distance Ha of the portion located radially outermost side is set to 1 μm or more and less than 50 μm, but may be less than 1 μm, or may be 50 μm or more. The taper angle θ1 is set to 0.05° or more and less than 1°, but may be less than 0.05°, or may be 1° or more.

In the example illustrated in FIG. 5, the axial position of the portion (innermost diameter portion) of the fixed core facing surface 13*b* located on the innermost diameter side matches the axial position of the stopper abutment end surface 61*a*. On the other hand, the axial position of the innermost diameter portion of the fixed core facing surface 13*b* may be located on the side opposite to the nozzle hole more than the stopper abutment end surface 61*a*.

The communication groove 32*e* illustrated in FIG. 5 is also formed on the third core abutment surface 32*d* in addition to the first core abutment surface 32*c* and the second core abutment surface 32*b*, but may not be formed on the third core abutment surface 32*d*. The communication groove 32*e* illustrated in FIG. 5 is formed over the entire region in the radial direction of the first core abutment surface 32*c*, but may be formed at least a portion of the first core abutment surface 32*c*, which is adjacent to the second core abutment surface 32*b*.

Although the outer communication groove 31*e* illustrated in FIG. 12 is located so as not to communicate with the through-hole 31*a*, the outer communication groove 31*e* may be located so as to communicate with the through-hole 31*a*. The communication groove 32*g* illustrated in FIG. 15 is formed across the first core abutment surface 32*c*, the second core abutment surface 32*b*, and the third core abutment surface 32*d*, but may not be formed on the third core abutment surface 32*d*.

Figure 17:
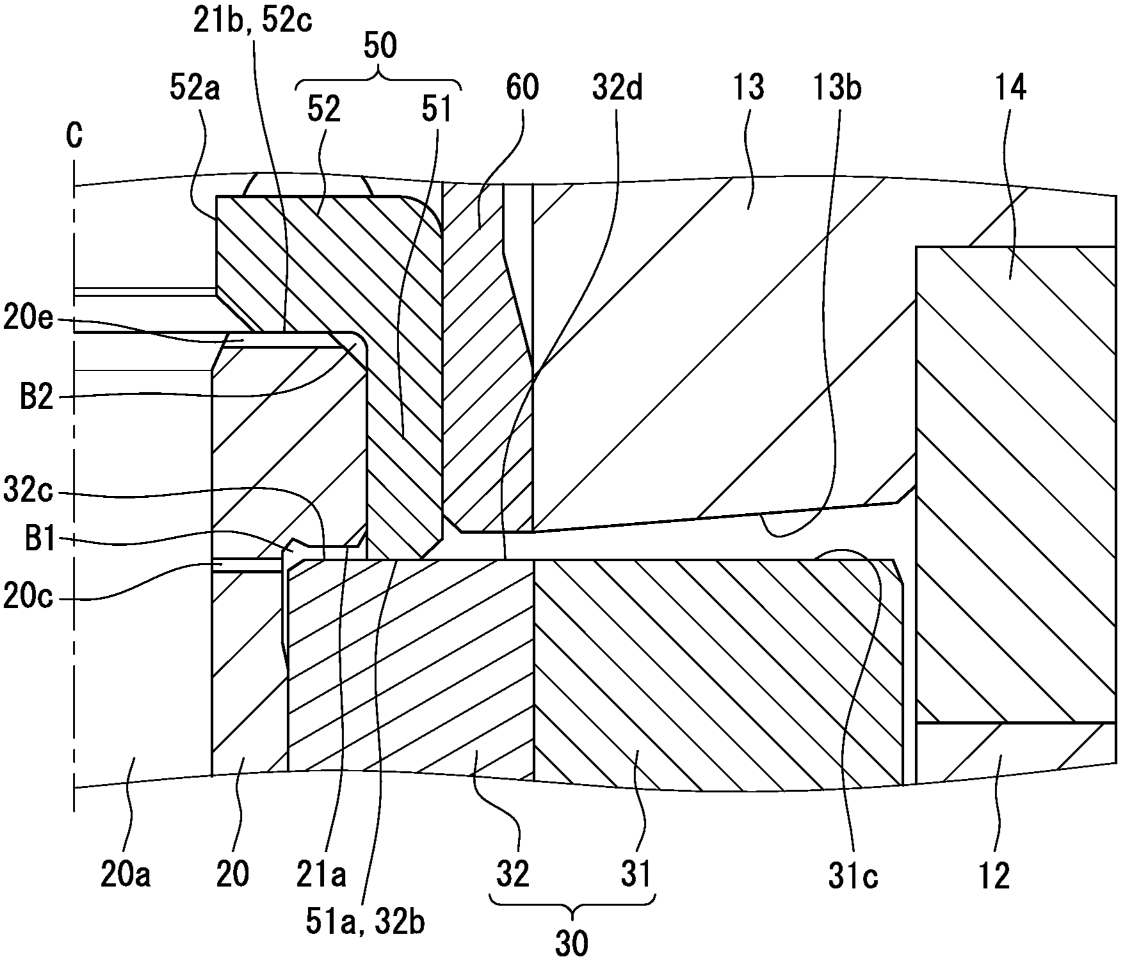
FIG. 17 is a cross-sectional view illustrating a modification B4 with respect to FIG. 5.

In the examples of FIGS. 17, 18, and 19, the communication groove 32*e* is eliminated, and instead of the communication groove 32*e*, the communication hole 20*c*, the sliding surface communication groove 20*d*, and the second sliding surface communication groove 32*h* are provided. On the other hand, the fuel injection valve 1 may include any two or more of the communication groove 32*e*, the communication hole 20*c*, the sliding surface communication groove 20*d*, and the second sliding surface communication groove 32*h*.

In the example of FIG. 18, the sliding surface communication groove 20*d* is formed in the needle 20, but the sliding surface communication groove may be formed in the transmission member-side sliding surface 51*c* (see FIG. 18) of the cup 50 on which the needle 20 slides. In the example of FIG. 19, the second sliding surface communication groove 32*h* is formed in the inner core 32, but the second sliding surface communication groove may be formed on the surface of the needle 20, which slides with the inner core 32.

In the first embodiment, the movable portion M is supported in the radial direction at two positions of the portion (needle tip portion) of the needle 20 facing the inner wall surface 11*c* of the nozzle hole body 11, and the outer peripheral surface 51*d* of the cup 50. On the other hand, the movable portion M may be supported in the radial direction at two positions of the outer peripheral surface of the movable core 30 and the needle tip portion.

In the first embodiment, the inner core 32 is formed of the non-magnetic material, but may be formed of the magnetic material. In a case where the inner core 32 is formed of the magnetic material, the inner core 32 may be formed of a weak magnetic material that is weaker in magnetism than that of the outer core 31. Similarly, the needle 20 and the guide member 60 may be formed of a weak magnetic material that is weaker in magnetism than that of the outer core 31.

In the first embodiment, when the movable core 30 is moved by a predetermined amount, the cup 50 is interposed between the first spring member SP1 and the movable core 30 in order to realize the core boost structure in which the movable core 30 abuts against the needle 20 to initiate the valve opening operation. On the other hand, the cup 50 may be eliminated, a third spring member different from the first spring member SP1 may be provided, and a core boost structure may be employed in which the movable core 30 is urged to the nozzle hole side by the third spring member.

In the first embodiment, in order to avoid a magnetic short circuit between the fixed core 13 and the main body 12, the non-magnetic member 14 is located between the fixed core 13 and the main body 12. Instead of the non-magnetic member 14, a magnetic member of a shape having a magnetic throttle portion for restricting the magnetic short circuit may be located between the fixed core 13 and the main body 12. Alternatively, the non-magnetic member 14 may be eliminated, and the magnetic throttle portion for restricting the magnetic short circuit may be formed in the fixed core 13 or the main body 12.

The sleeve 40 according to the first embodiment has a shape in which the coupling portion 42 extends on the upper side (side opposite to the nozzle hole) of the support portion 43, and the insertion cylindrical portion 41 extends on the upper side of the coupling portion 42. On the other hand, the sleeve 40 may have a shape in which the coupling portion 42 extends on the lower side (nozzle hole side) of the support portion 43, and the insertion cylindrical portion 41 further extends on the lower side of the coupling portion 42. The sleeve 40 may also be a hollow shaped ring extending annularly around the needle 20. In this case, an upper surface of the ring supports the second spring member SP2, and an inner peripheral surface of the ring is press-fitted into the press-fit portion 23.

The cup 50 according to the first embodiment has a cup shape having the disk portion 52 and the cylindrical portion 51. On the other hand, the cup 50 may have a flat plate shape. In this case, a surface (upper surface) on an upper side of the flat plate abuts against the first spring member SP1, and a surface (lower surface) on a lower side of the flat plate abuts against the movable core 30.

The support member 18 according to the first embodiment has the cylindrical shape, but may have a C-shaped cross section in which a slit extending in the axis line C direction is formed in a cylindrical shape.

The movable core 30 according to the first embodiment has a structure having two components of the outer core 31 and the inner core 32. The inner core 32 is made of a material having a higher hardness than that of the outer core 31, and has the surface abutting against the cup 50 and the guide member 60, and the surface sliding with the needle 20. On the other hand, the movable core 30 may have a structure in which the inner core 32 is eliminated.

As described above, in a case where the movable core 30 has the structure in which the inner core 32 is eliminated, it is desirable that plating is applied to the abutment surface of the movable core 30 that abuts against the cup 50 and the guide member 60, and the sliding surface that slides with the needle 20. One specific example of plating applied to the abutment surface is chromium. One specific example of plating applied to the sliding surface is nickel phosphorus.

The fuel injection valve 1 according to the first embodiment has a structure in which the movable core 30 abuts against the guide member 60 attached to the fixed core 13. On the other hand, a structure, in which the movable core 30 abuts against the fixed core 13 where the guide member 60 is eliminated, may be provided. In short, a structure, in which the inner core 32 abuts against the guide member 60, may be provided or a structure, in which the inner core 32 abuts against the fixed core 13 where the guide member 60 is eliminated, may be provided. A structure, in which the movable core 30 abuts against the guide member 60 where the inner core 32 is eliminated, may be provided, or a structure, in which the movable core 30 where the inner core 32 is eliminated abuts against the fixed core 13 where the guide member 60 is eliminated, may be provided.

As described above, in the case of the structure in which the inner core 32 is eliminated in the movable core 30, in the surface of the movable core 30 on the side opposite to the nozzle hole, a surface abutting against the needle 20 corresponds to the first core abutment surface 32*c*. As described above, in the case of the structure in which the guide member 60 is eliminated, in the surface of the movable core 30, a surface abutting against the fixed core 13 corresponds to the third core abutment surface 32*d*.

In the first embodiment, the communication groove 32*e* is formed at a portion of the inner core 32, which abuts against the guide member 60. On the other hand, as described above, in the case of the structure in which the guide member 60 is eliminated, the communication groove 32*e* is formed at the portion of the inner core 32, which abuts against the fixed core 13. As described above, in the case of the structure in which the inner core 32 is eliminated in the movable core 30, the communication groove 32*e* is formed at the portion of the movable core 30, which abuts against the fixed core 13.

The cup 50 according to the first embodiment slides in the axis line C direction while being in contact with the inner peripheral surface of the guide member 60. On the other hand, a structure, in which the cup 50 moves in the axis line C direction while forming a predetermined gap with the inner peripheral surface of the guide member 60, may be provided.

In the first embodiment, the inner peripheral surface of the second spring member SP2 is guided by the coupling portion 42 of the sleeve 40. On the other hand, the outer peripheral surface of the second spring member SP2 may be guided by the outer core 31.

In the first embodiment, one end of the second spring member SP2 is supported by the movable core 30, and the other end of the second spring member SP2 is supported by the sleeve 40 attached to the needle 20. On the other hand, the sleeve 40 may be eliminated, and the other end of the second spring member SP2 may be supported by the main body 12.

What is claimed is:

1. A fuel injection valve comprising:

a valve body configured to open and close a nozzle hole to inject fuel;

a fixed core configured to generate a magnetic attraction force with energization of a coil and has an attracting surface on which a magnetic attraction force is to act;

a movable core that has an attracted surface facing the attracting surface and is configured to be attracted to the fixed core in a state of being engaged with the valve body to cause the valve body to perform a valve opening operation; and a stopper member configured to abut against the movable core to restrict movement of the movable core in a direction opposite from the nozzle hole, wherein the movable core has an abutment portion configured to abut against the stopper member and a core body portion in which the attracted surface is formed, the attracting surface and the attracted surface have a shape extending annularly around an axis line of the fixed core, are formed so as to be separated from each other in an axis line direction in a state where the abutment portion abuts against the stopper member, and are formed in a shape in which a separation distance from each other increases toward a radially outer side of an annular shape, the stopper member has a stopper abutment end surface configured to abut against the movable core, the attracting surface extends from the stopper abutment end surface toward the radially outer side, the attracting surface is formed in a tapered shape inclining in a direction such that the separation distance increases toward the radially outer side of the annular shape, the stopper member is a component separate from the fixed core and is arranged inside the fixed core, and the attracting surface extends from an outer peripheral end of the stopper member toward the radially outer side.

2. The fuel injection valve according to claim 1, wherein in a cross section including a perpendicular line to the axis line direction and the axis line, a taper angle which is an angle formed by a surface forming the tapered shape and the perpendicular line is larger than a maximum angle at which the movable core is capable of tilting with respect to the axis line.

3. The fuel injection valve according to claim 1, further comprising:

a main body that accommodates the movable core, wherein the movable core and the main body are configured such that fuel pushed out from a space between the attracting surface and the attracted surface in accordance with the valve opening operation is discharged from a gap between an outer peripheral surface of the movable core and an inner peripheral surface of the main body, the attracting surface is formed in the tapered shape, and the attracted surface is formed in a flat shape extending perpendicularly to the axis line direction.

4. The fuel injection valve according to claim 1, wherein the separation distance of a portion on a radially outermost side is 1 μm or more and less than 50 μm.

5. The fuel injection valve according to claim 1, wherein in a cross section including a perpendicular line to the axis line direction and the axis line, a taper angle, which is an angle formed by a surface forming the tapered shape and the perpendicular line, is 0.05° or more and less than 1°.

6. The fuel injection valve according to claim 1, wherein the movable core is assembled to the valve body in a state of being relatively movable in the axis line direction.

7. The fuel injection valve according to claim 6, wherein the movable core engages with the valve body to initiate the valve opening operation when the movable core moves by a predetermined amount in the direction opposite from the nozzle hole.

8. The fuel injection valve according to claim 1, wherein an outer peripheral surface of the fixed core is formed in a tapered shape inclining in a direction such that the separation distance increases toward the radially outer side of the annular shape, and in a cross section including a perpendicular line to the axis line direction and the axis line, the attracting surface extends linearly toward a radially inner side of the outer peripheral surface of the fixed core.

9. The fuel injection valve according to claim 1, wherein the stopper member has a cylindrical shape and is press-fit into the fixed core.

10. The fuel injection valve according to claim 1, wherein in a cross section including a perpendicular line to the axis line direction and the axis line, a taper angle which is an angle formed by a surface forming the tapered shape and the perpendicular line is larger than a maximum angle at which the valve body is capable of tilting with respect to the axis line.

11. The fuel injection valve according to claim 1, wherein the stopper member includes a disk portion having a disk shape and a cylindrical portion having a cylindrical shape.

12. The fuel injection valve according to claim 1, wherein the stopper member includes a disk portion having a disk shape and a cylindrical portion having a cylindrical shape; and the disk portion has a through-hole penetrating in the axis line direction.

13. The fuel injection valve according to claim 1, further comprising a cup having an inner wall surface for slidably supporting the valve body;

wherein a portion of the stopper is arranged between the cup and the fixed core.

* * * * *